United States Patent
Karamcheti et al.

(10) Patent No.: US 9,672,158 B2
(45) Date of Patent: *Jun. 6, 2017

(54) ASYMMETRIC MEMORY MIGRATION IN HYBRID MAIN MEMORY

(71) Applicant: Virident Systems Inc., Milpitas, CA (US)

(72) Inventors: Vijay Karamcheti, Los Altos, CA (US); Kenneth A. Okin, Saratoga, CA (US); Kumar Ganapathy, Los Altos, CA (US); Ashish Singhai, Cupertino, CA (US); Rajesh Parekh, Los Altos, CA (US)

(73) Assignee: Virident Systems Inc., Milpitas, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/990,314

(22) Filed: Jan. 7, 2016

(65) Prior Publication Data

US 2016/0117131 A1 Apr. 28, 2016

Related U.S. Application Data

(63) Continuation of application No. 14/047,603, filed on Oct. 7, 2013, now Pat. No. 9,262,333, which is a
(Continued)

(51) Int. Cl.
*G06F 12/00* (2006.01)
*G06F 12/1009* (2016.01)
(Continued)

(52) U.S. Cl.
CPC .......... *G06F 12/1009* (2013.01); *G06F 3/064* (2013.01); *G06F 3/0604* (2013.01);
(Continued)

(58) Field of Classification Search
CPC .... G06F 3/068; G06F 3/0685; G06F 12/1009; G06F 12/1475; G06F 13/1694
(Continued)

(56) References Cited

U.S. PATENT DOCUMENTS 4,757,533 A 7/1988 Allen et al.
5,012,408 A 4/1991 Conroy
(Continued)

OTHER PUBLICATIONS

U.S. Notice of Allowance for U.S. Appl. No. 11/935,224 dated Apr. 5, 2010, 10 pages.
(Continued)

*Primary Examiner* — Reba I Elmore
(74) *Attorney, Agent, or Firm* — Fish & Richardson P.C.

(57) ABSTRACT

Main memory is managed by receiving a command from an application to read data associated with a virtual address that is mapped to the main memory. A memory controller determines that the virtual address is mapped to one of the symmetric memory components of the main memory, and accesses memory use characteristics indicating how the data associated with the virtual address has been accessed, The memory controller determines that the data associated with the virtual address has access characteristics suited to an asymmetric memory component of the main memory and loads the data associated with the virtual address to the asymmetric memory component of the main memory. After the loading and using the memory management unit, a command is received from the application to read the data associated with the virtual address, and the data associated with the virtual address is retrieved from the asymmetric memory component.

20 Claims, 18 Drawing Sheets

Related U.S. Application Data continuation of application No. 13/443,086, filed on Apr. 10, 2012, now Pat. No. 8,555,002, which is a continuation of application No. 12/853,135, filed on Aug. 9, 2010, now Pat. No. 8,156,288, which is a continuation of application No. 11/935,224, filed on Nov. 5, 2007, now Pat. No. 7,774,556.

(60) Provisional application No. 60/864,399, filed on Nov. 4, 2006.

(51) Int. Cl.

| | | |
|---|---|---|
| G06F 13/16 | (2006.01) | |
| G06F 9/50 | (2006.01) | |
| G06F 12/08 | (2016.01) | |
| G06F 12/121 | (2016.01) | |
| G06F 12/10 | (2016.01) | |
| G06F 3/06 | (2006.01) | |
| G06F 12/02 | (2006.01) | |
| G06F 12/14 | (2006.01) | |

(52) U.S. Cl.
CPC ............ *G06F 3/068* (2013.01); *G06F 3/0647* (2013.01); *G06F 3/0685* (2013.01); *G06F 9/5016* (2013.01); *G06F 12/0207* (2013.01); *G06F 12/08* (2013.01); *G06F 12/10* (2013.01); *G06F 12/121* (2013.01); *G06F 13/1657* (2013.01); *G06F 3/0628* (2013.01); *G06F 3/0638* (2013.01); *G06F 3/0646* (2013.01); *G06F 12/0223* (2013.01); *G06F 12/0292* (2013.01); *G06F 12/1475* (2013.01); *G06F 13/1694* (2013.01); *G06F 2212/205* (2013.01); *G06F 2212/657* (2013.01); *Y02B 60/1225* (2013.01); *Y02B 60/1228* (2013.01); *Y02B 60/142* (2013.01)

(58) Field of Classification Search
USPC ....... 711/101, 103, 146, 170, 152, 165, 203, 711/205, 221; 707/781, 786, 788, 803; 710/26, 33, 43, 104, 107; 712/13, 225
See application file for complete search history.

(56) References Cited

U.S. PATENT DOCUMENTS

| | | | | |
|---|---|---|---|---|
| 5,337,275 | A * | 8/1994 | Garner | G06F 3/0601 365/185.11 |
| 5,404,485 | A | 4/1995 | Ban | |
| 6,134,619 | A | 10/2000 | Futral et al. | |
| 6,226,734 | B1 | 5/2001 | Kleinsorge et al. | |
| 6,393,545 | B1 | 5/2002 | Long et al. | |
| 6,549,959 | B1 | 4/2003 | Yates et al. | |
| 6,564,326 | B2 | 5/2003 | Helbig | |
| 6,970,968 | B1 | 11/2005 | Holman | |
| 7,761,623 | B2 | 7/2010 | Karamcheti et al. | |
| 7,761,624 | B2 | 7/2010 | Karamcheti et al. | |
| 7,761,625 | B2 | 7/2010 | Karamcheti et al. | |
| 7,761,626 | B2 | 7/2010 | Karamcheti et al. | |
| 7,774,556 | B2 * | 8/2010 | Karamcheti | G06F 9/5016 711/146 |
| 7,818,489 | B2 | 10/2010 | Karamcheti et al. | |
| 7,913,055 | B2 | 3/2011 | Karamcheti et al. | |
| 7,930,513 | B2 | 4/2011 | Karamcheti et al. | |
| 8,156,288 | B2 * | 4/2012 | Karamcheti | G06F 9/5016 711/146 |
| 8,555,002 | B2 * | 10/2013 | Karamcheti | G06F 9/5016 711/146 |
| 8,638,805 | B2 | 1/2014 | Sundararaman et al. | |
| 9,262,333 | B2 * | 2/2016 | Karamcheti | G06F 9/5016 |
| 2002/0051350 | A1 | 5/2002 | Take | |
| 2002/0118593 | A1 | 8/2002 | Takemae | |
| 2002/0133684 | A1 * | 9/2002 | Anderson | G11C 5/04 711/200 |
| 2002/0138600 | A1 | 9/2002 | Singhal | |
| 2003/0137862 | A1 | 7/2003 | Brunelle et al. | |
| 2003/0188082 | A1 | 10/2003 | Wu | |
| 2003/0188083 | A1 | 10/2003 | Kumar et al. | |
| 2004/0117581 | A1 | 6/2004 | Lee | |
| 2004/0160835 | A1 | 8/2004 | Altman et al. | |
| 2004/0186948 | A1 | 9/2004 | Lofgren et al. | |
| 2004/0193783 | A1 | 9/2004 | Sharma et al. | |
| 2004/0240745 | A1 | 12/2004 | Sugimoto et al. | |
| 2005/0044303 | A1 | 2/2005 | Perego et al. | |
| 2005/0166026 | A1 | 7/2005 | Ware et al. | |
| 2005/0235131 | A1 | 10/2005 | Ware | |
| 2005/0240745 | A1 | 10/2005 | Iyer et al. | |
| 2005/0243570 | A1 | 11/2005 | Chaves et al. | |
| 2005/0251617 | A1 | 11/2005 | Sinclair et al. | |
| 2005/0273570 | A1 | 12/2005 | DeSouter et al. | |
| 2005/0289317 | A1 | 12/2005 | Liou et al. | |
| 2006/0020744 | A1 * | 1/2006 | Sinclair | G06F 12/0246 711/103 |
| 2006/0106984 | A1 | 5/2006 | Bartley et al. | |
| 2006/0112219 | A1 * | 5/2006 | Chawla | G06F 3/0607 711/114 |
| 2006/0149857 | A1 | 7/2006 | Holman | |
| 2006/0230250 | A1 | 10/2006 | Klint et al. | |
| 2008/0109626 | A1 | 5/2008 | Lee et al. | |
| 2008/0109629 | A1 | 5/2008 | Karamcheti et al. | |
| 2008/0177978 | A1 | 7/2008 | Karamcheti et al. | |
| 2008/0263348 | A1 | 10/2008 | Zaltsman et al. | |
| 2009/0106478 | A1 | 4/2009 | Okin et al. | |
| 2009/0157989 | A1 | 6/2009 | Karamcheti et al. | |
| 2010/0325383 | A1 | 12/2010 | Karamcheti et al. | |
| 2011/0022788 | A1 | 1/2011 | Karamcheti et al. | |
| 2011/0173371 | A1 | 7/2011 | Karamcheti et al. | |
| 2012/0198140 | A1 | 8/2012 | Karamcheti et al. | |
| 2012/0198141 | A1 | 8/2012 | Karamcheti et al. | |

OTHER PUBLICATIONS

Lee, H.G., and Chang, N., "Energy-Aware Memory Allocation in Heterogeneous Non-Volatile Memory Systems," Low Power Electronics and Design, Aug. 2003, retrieved from http://ieeexplore.ieee.org/ie15/8720/27594/01231941.pdf?tp=&isnumber=&arnumber=12394> on May 1, 2008.

Tseng, H.W., et al., "An Energy-Efficient Virtual Memory System with Flash Memory as the Secondary Storage," Low Power Electronics and Design, Oct. 4-6, 2006, retrieved from http://ieeexplore.ieee.org/xpls/abs_all.jsp?arnumber=4271879> on May 1, 2008.

International Search Report and Written Opinion for International Application No. PCT/US07/83669, dated Apr. 30, 2008, 9 pages.

International Search Report and Written Opinion for International Application No. PCT/US07/83671, dated May 22, 2008, 14 pages.

International Search Report and Written Opinion for International Application No. PCT/US07/83668, dated May 15, 2008, 8 pages.

International Search Report and Written Opinion for International Application No. PCT/US07/83666, dated Apr. 21, 2008, 9 pages.

International Search Report and Written Opinion for International Application No. PCT/US07/79622, dated Apr. 9, 2008, 12 pages.

Office Action for U.S. Appl. No. 11/864,763, mailed Jun. 16, 2008, 11 pages.

International Search Report and Written Opinion for International Application No. PCT/US07/80015, dated Aug. 13, 2008, 13 pages.

U.S. Non-Final Office Action for U.S. Appl. No. 12/853,135 dated Oct. 8, 2010, 11 pages.

U.S. Final Office Action for U.S. Appl. No. 12/853,135 dated Jun. 22, 2011, 10 pages.

U.S. Notice of Allowance for U.S. Appl. No. 12/853,135 dated Dec. 5, 2011, 5 pages.

U.S. Non-Final Office Action for U.S. Appl. No. 13/443,086 dated Dec. 26, 2012, 10 pages.

U.S. Notice of Allowance for U.S. Appl. No. 13/443,086 dated Jun. 5, 2013, 6 pages.

U.S. Non-Final Office Action for U.S. Appl. No. 14/047,603 dated Sep. 11, 2014, 10 pages.

(56) References Cited

OTHER PUBLICATIONS

U.S. Notice of Allowance for U.S. Appl. No. 14/047,603 dated May 8, 2015, 5 pages.

* cited by examiner

1300

Memory Controller:
Available NOR Flash Memory: 512 GB
Available DRAM: 4 GB
Application: Search query server
Size of Search Application: 278 GB
Operating System Memory requirement: 2 GB
Sustained Processor utilization: 40%
Average utilization per 32 GB NOR Flash Bank: 16 GB

```
                    Memory Controller:
Available NOR Flash Memory: 512 GB
Available DRAM: 4 GB
Application: Search Query Server
Size of Search Application: 600 GB
Operating System Memory requirement: 2 GB
Sustained Processor utilization: 70%
Average utilization per 32 GB NOR Flash Bank:  32 GB
```

FIG. 15

ASYMMETRIC MEMORY MIGRATION IN HYBRID MAIN MEMORY

CROSS-REFERENCE TO RELATED APPLICATIONS

This application is a continuation of U.S. patent application Ser. No. 14/047,603, filed Oct. 7, 2013, now allowed, and entitled "ASYMMETRIC MEMORY MIGRATION IN HYBRID MAIN MEMORY," which is a continuation of U.S. patent application Ser. No. 13/443,086, filed Apr. 10, 2012, and entitled "ASYMMETRIC MEMORY MIGRATION IN HYBRID MAIN MEMORY," now U.S. Pat. No. 8,555,002, which is a continuation of U.S. patent application Ser. No. 12/853,135, filed Aug. 9, 2010, and entitled "ASYMMETRIC MEMORY MIGRATION IN HYBRID MAIN MEMORY," now U.S. Pat. No. 8,156,288, which is a continuation of U.S. patent application Ser. No. 11/935,224, filed Nov. 5, 2007, and entitled "ASYMMETRIC MEMORY MIGRATION IN HYBRID MAIN MEMORY," now U.S. Pat. No. 7,774,556, which claims priority to U.S. Provisional Application No. 60/864,399, entitled, "MEMORY MANAGEMENT OF HYBRID MAIN MEMORY INCLUDING SYMMETRIC AND ASYMMETRIC MEMORY," and filed on Nov. 4, 2006. The contents of the prior applications are incorporated herein by reference in their entirety.

TECHNICAL FIELD

This document relates to memory systems.

BACKGROUND

Main memory is memory that is accessible to a central processing unit ("CPU") of a computer or electronic device. Main memory is used to store data that is deemed likely to be actively used by the CPU. The CPU may access data within the main memory that is identified by using virtual addresses to map to corresponding physical addresses associated with the main memory.

SUMMARY

In one general sense, a memory controller manages main memory that includes symmetric memory components associated with a first collection of memory operations and asymmetric memory components associated with a second collection of memory operations. The symmetric memory components are each configured to enable random access write operations in which an address within a block of the symmetric memory component is written without affecting the availability of other addresses within the block of the symmetric memory component. Asymmetric memory components are each configured to enable block write operations in which an address within a block of one of the asymmetric memory components affects the availability of other addresses within the block of the asymmetric memory component. A command is received, on a central processing unit, from an application to read data associated with a virtual address that is mapped to the main memory. Using the memory management unit, it is determined that the virtual address is mapped to one of the symmetric memory components of the main memory. Memory use characteristics are accessed that indicate how the data associated with the virtual address has been accessed. Based on the memory use characteristics, it is determined that the data associated with the virtual address has access characteristics suited to an asymmetric memory component of the main memory. Using the CPU, the data associated with the virtual address to the asymmetric memory component of the main memory is loaded. After the loading and using the memory management unit, a command from the application is received to read the data associated with the virtual address. Responsive to the received command, the data associated with the virtual address is retrieved from the asymmetric memory component of the main memory.

Implementations may include one or more of the following features. For example, the symmetric memory component may include dynamic random access memory (DRAM) and the asymmetric memory component includes NOR flash, where the DRAM is configured to enable random access write operations in which an address within a block of the DRAM is written without affecting the availability of other addresses within the block of the DRAM, and where the NOR flash is configured to enable block write operations in which an address within a block of one of the NOR flash affects the availability of other addresses within the block of the NOR flash. It is determined using the memory management unit, that the virtual address is mapped to one of the DRAM blocks. Memory use characteristics are accessed indicating how the data associated with the virtual address has been accessed within the DRAM block. Based on the memory use characteristics, it is determined that the data associated with the virtual address has access characteristics suited to NOR flash of the main memory. Using the CPU, the data associated with the virtual address is loaded to the NOR flash of the main memory. After the loading and using the memory management unit, a command from the application is received to read the data associated with the virtual address. Responsive to the received command, the data associated with the virtual address is retrieved from the NOR flash of the main memory.

Determining that the data associated with the virtual address has access characteristics suited for use in the asymmetric memory component of the main memory may include determining that the access characteristics are related to a profile that indicates whether the data should be loaded to the asymmetric memory component based on a number of times the data has been read and the number of times that the data has been updated using a write instruction.

The asymmetric memory component has asymmetric access characteristics that may include (1) the asymmetric memory component performs read operations at a first rate and performs write operations at a second rate that is more than an order of magnitude different than the first rate, (2) the asymmetric memory component uses an asymmetric memory access protocol, and (3) the asymmetric memory component includes non-volatile storage capability. The symmetric memory component has symmetric access characteristics that may include (1) the symmetric memory component performs read operations at a rate that that differs by less than an order of magnitude from a rate at which write operations are performed, (2) the symmetric memory component uses a symmetric memory access protocol, and (3) the symmetric memory component includes a volatile storage capability.

Loading the data associated with the virtual address to the asymmetric memory component of main memory may include loading the data as part of a block write that includes additional content that is different than the data.

The data to be loaded to the asymmetric memory component as a first portion may be identified from a first read instruction and the first portion may be stored in the symmetric memory component of the main memory. Other content to be loaded to the symmetric memory component as a second portion may be identified from a second read instruction and the second portion may be stored in the symmetric memory component of the main memory. The first portion and the second portion may be structured as a block to be written to the asymmetric memory component and the block that includes the first portion and the second portion may be written to the asymmetric memory component.

Determining that the data associated with the virtual address has access characteristics suited for use in the asymmetric memory component may includes determining that an application is operating in a constrained environment for memory resources and adjusting constrained metrics used in determining whether to load the data to the asymmetric memory component to increase a likelihood that the data is loaded the asymmetric memory component.

Determining that the data associated with the virtual address has access characteristics suited for use in the asymmetric memory component may include determining that an application is unconstrained for memory resources and using unconstrained metrics to determine whether to load the data to the asymmetric memory component.

A write protection bit for the data that has been loaded to asymmetric memory may be set that regulates subsequent write access to the virtual address for the data. Determining, based on the memory use characteristics, that the data associated with the virtual address has the access characteristics suited to the asymmetric memory component of the main memory may include determining that a first threshold number of reads of the data has occurred in an observation window. It may be determined that the data associated with the virtual address does not have the access characteristics suited to the asymmetric memory component of the main memory in response to determining that a second threshold number of updates to the data has been requested in an observation window.

DESCRIPTION OF DRAWINGS

FIG. 13 is an illustration of an unconstrained configuration used by a memory controller.

FIG. 15 is an illustration of a constrained configuration used by a memory controller.

DETAILED DESCRIPTION

Figure 1:
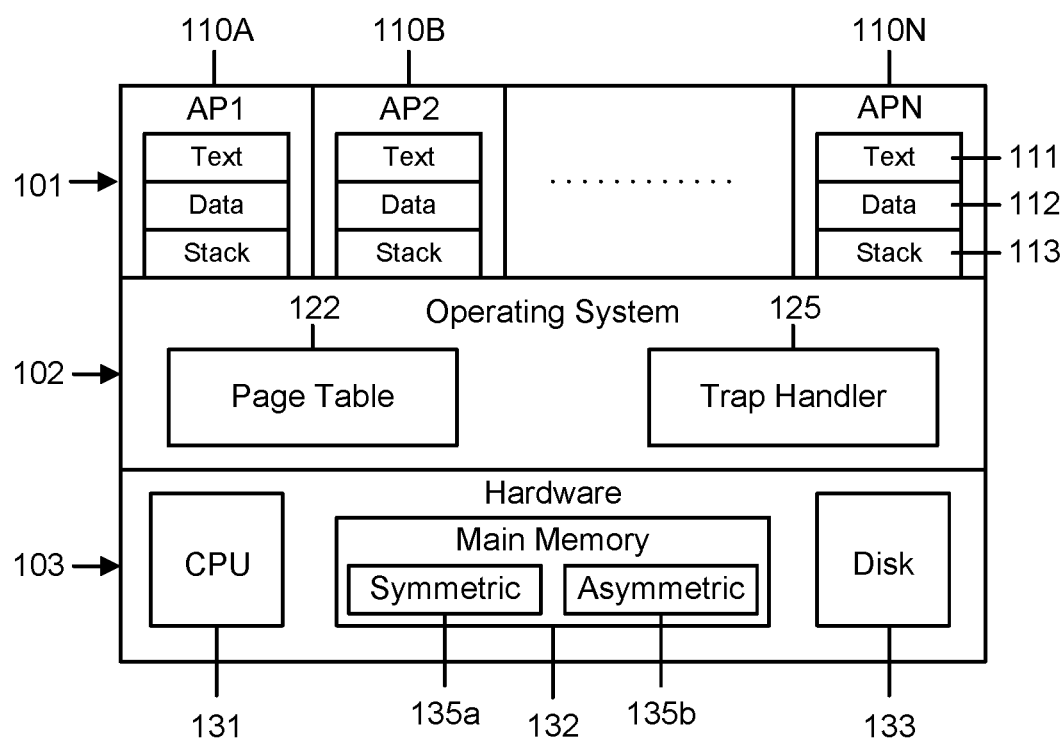
FIG. 1 illustrates an example of a first layer model of a computing system.

The detailed description is divided into four sections. Section A provides a brief description of method and mechanisms. Section B provides a description of the hardware, software, and system context. Section C provides a description of read movement and write movement. Section D provides a discussion of operations performed and additional configurations.

A. Brief Description of Method/Mechanism

Server systems may be built with large amounts of flash memory configured to act as main memory, thereby supplementing or replacing volatile memory components (e.g., Dynamic Random Access Memory (DRAM)) in main memory. The use of flash memory may reduce power consumption and increase performance of server systems.

Memory systems configured as such include components with symmetric and asymmetric technologies. For example, a DRAM memory system may have symmetric characteristics—namely, read and write operations can be performed at comparable rates and incur similar run times. Read and write operations do not markedly degrade the lifespan of the DRAM memory system . . . .

Memory systems may also include components with asymmetric characteristics (e.g., flash memory). The asymmetric memory may be described as having asymmetric characteristics where, for example, read operations are performed relatively quickly, while write operations are performed relatively slowly in comparison to read operations. Furthermore, for some categories of asymmetric memory, write operations may degrade the lifespan of the memory more rapidly than read operations. In addition, asymmetric memory components also behave differently in that data is written using a block write, which creates a disruption region that impacts several blocks. A disruption region generally refers to a region whose access behavior is impacted (often undesirably) during a write to an asymmetric memory component. The access behavior may include corrupt data, access delays, and/or an inability to have confidence in results that are returned during a read operation (even if the results are correct and not delayed). And, although the data to be written may itself affect only a portion of the disruption region, a block write can affect a larger amount of storage within the disruption region. To illustrate, writing a 2 Mbyte block during a block write may affect a 2 GByte disruption region in a 16 GByte memory component.

A memory controller (e.g., a software module and/or specialized hardware circuit) may be used to manage a memory system that includes symmetric and asymmetric components. For example, a controller may perform the memory operations that interface with a hybrid main memory including DRAM and flash memory. Because applications may have particular profiles, where particular objects in memory are used in a particular way, the controller may be configured to track memory characteristics for the different memory objects. The memory characteristics then may be used in deciding whether one or more of the memory objects should be stored in symmetric memory or asymmetric memory. In deciding to leverage the different types of main memory in storing a memory object, logic may be employed to leverage symmetric memory (e.g., DRAM) when loading memory objects that involve a threshold degree of write operations. Similarly, logic may be employed to leverage asymmetric memory (e.g., flash memory) when loading objects that do not involve a threshold degree of write operations.

For example, a search application running on a server system with symmetric and asymmetric components may be broken down into two different types of memory operations. In one type of memory-dependent operation, a search application may process a search query by receiving a search query, accessing an index of search terms, relating the search query to the search index, and returning results based on the relationship between the search query and the search index. In this operation, the search index includes a large data structure requiring large amounts of memory, and, except for updates to the search index, mostly involves read operations. Thus, the server system may be configured to load the search index to asymmetric (e.g., flash) memory.

In another type of memory-dependent operation, the search application updates the search index with newly-discovered data. In this operation, the server system may determine that updating the search index executes a threshold degree of write operations. As a result, in updating the search index, the server system may be configured to load those portions of the search index being updated to symmetric (e.g., DRAM) memory.

Memory management may be performed on a variety of systems, and in a variety of manners. In one implementation, a memory controller is configured to provide a degree of abstraction between a CPU and the configuration of the hybrid memory that includes symmetric and asymmetric memory components. The memory controller may include software that is configured to track memory characteristics for objects so that write-intensive objects are loaded to symmetric memory components and read-intensive objects are loaded to asymmetric memory components. The memory controller may be configured to operate independent of the application and/or OS to reduce the modification and work required of the application and/or OS to implement a hybrid main memory. In one configuration, software associated with the operating system updates the MMU page tables.

B. Description of Hardware, Software, and System Context

Referring now to FIG. 1, an example of a first layer model 100 of a computing system is illustrated. The first layer model 100 includes an application (AP) layer 101, an operating system (OS) layer 102, and a hardware (HW) layer 103. The AP layer 100 includes one or more application processes AP1 110A through APN 110N.

Examples of application processes may include a web browsing or hosting program, a word processing program, a search program, a data mining and analytical program, or other type of application configured to execute on the AP layer. Application programs may be stored on a disk and remain in a passive state until a user chooses to execute an application program where it is loaded into memory as an application process.

Although other application processes may be employed, each application process (AP1 110A to APN 110N) loaded into memory may be allocated space in the main memory including a text region 111, a data region 112, and a stack region 113. The text region 111 may include executable instructions associated with the application program. The data region 112 may include data associated with the application. The data may be dynamic and/or static. The stack region 113 may include a state of a function or procedure of the application program and its activation frame.

The hardware layer 103 may include a central processing unit or processor 131, a main memory 132, and a hard disk storage 133. The main memory 132 may include symmetric memory 135a (e.g., DRAM) and asymmetric memory 135b (e.g., flash memory). In one implementation, the non-volatile or flash memory 135b is NOR flash electrically erasable programmable read only memory (EEPROM).

The operating system layer 102 resides between the HW layer 103 and the AP layer 101. The operating system layer 102 may be a modified operating system, such as Microsoft Windows, Linux, or other flavors of Unix, configured to manage hardware included in the HW layer 103 of the computer system.

Multiple processes may place demands on main memory 132 in a computer system. The operating system may respond to those demands for main memory 132 by managing how physical memory is allocated to a virtual address space of each process executing on the AP layer 101. In some implementations, the operating system may use virtual memory management techniques to indicate to the application processes that there is more memory capacity available for use over and beyond the physical memory capacity in main memory 132. In these implementations, the operating system 102 maintains a page table 122 to map virtual addresses in application processes to physical addresses in main memory 132. The hard disk storage 133 may be used to provide additional memory capacity for an application process.

Virtual memory management techniques may be configured to estimate the immediate memory needs in a specified application and allocate physical memory responsive to the specified application's needs, as opposed to other memory requirements that can be deferred and allocated to hard disk storage 133. A contiguous addressable range of memory, referred to as a page, may be swapped between physical main memory 132 and hard disk storage 133 as its need for immediate use increases or decreases.

Figure 2:
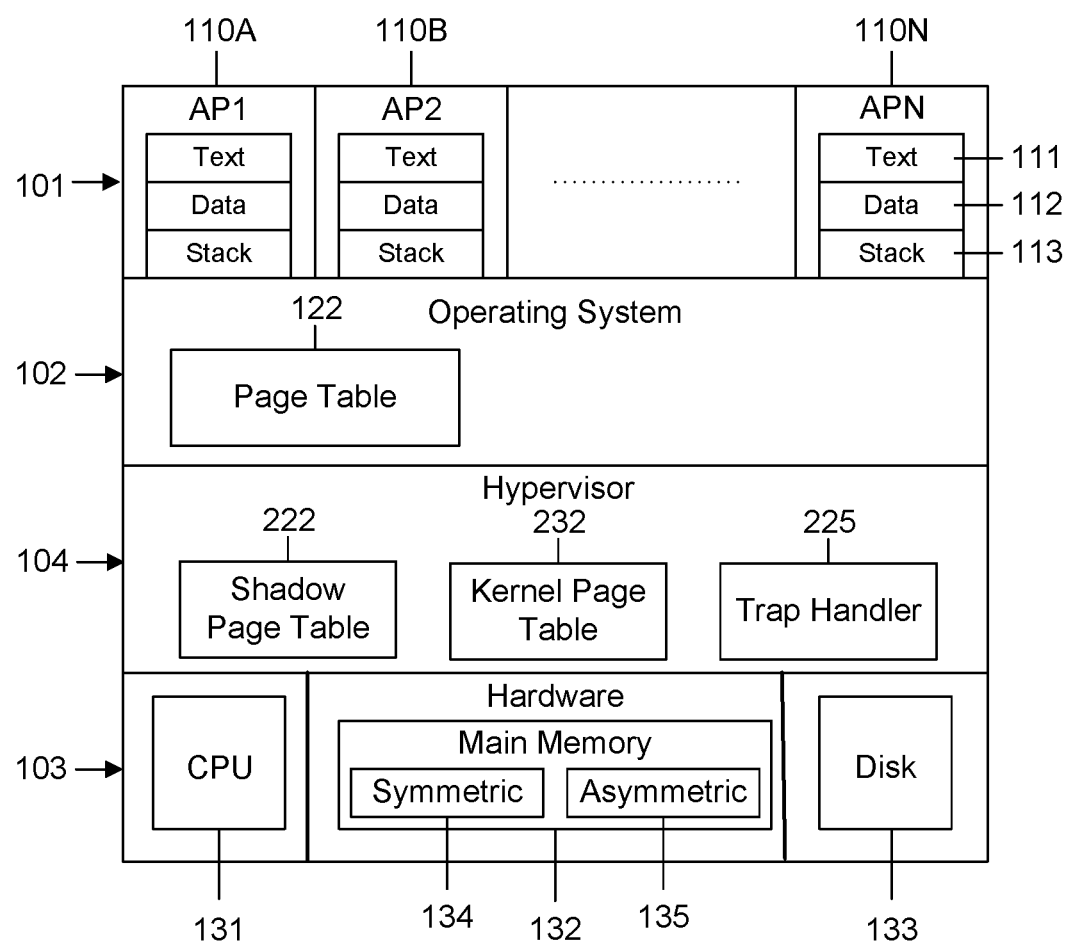
FIG. 2 illustrates an example of a second layer model of a computing system.

Referring now to FIG. 2, an example of a second layer model 200 of a computing system is illustrated. The second layer model 200 includes an application (AP) layer 101, an operating system (OS) layer including one or more host operating systems 102, a hypervisor layer 104, and a hardware (HW) layer 103.

A hypervisor in a computer system may be a layer of hardware, software, firmware, or combinations thereof operating between the operating system layer and the hardware layer that allows one or more host operating systems (or portions of an operating system) to run, unmodified, on a host computer at the same time.

The second layer model 200 differs from the first layer model 100 in that the hypervisor layer 104 is included between the operating system layer 102 and the hardware layer 103, and, instead of the operating system being modified, the hypervisor in the hypervisor layer 104 includes a hypervisor trap handler 225 configured to manage updates to the per-operating system page tables maintained by the hypervisor. The hypervisor trap handler 225 may be configured to ensure compliant modifications to the page table mappings.

Each of the one or more host operating systems 102 may maintain one or more page tables 122 to map virtual addresses in application processes to physical addresses in main memory 135. The hypervisor 104 may maintain one or more respective shadow page tables 222 for each host operating system to map virtual addresses of the application processes to physical addresses in main memory 135.

C. Description of Read Movement and Write Movement

FIGS. 1-2 illustrate different components in a server system that may be configured to interface with and control aspects of a memory system with symmetric and asymmetric components. In one configuration, a hybrid (e.g., symmetric/asymmetric volatile/non-volatile, DRAM/flash, etc.) memory system may be used by modifying application programs to decide which portions of its text (e.g., code) and data areas to map to symmetric regions and asymmetric regions in the main memory. The mapping by the application program may be modified to reflect characteristics of different types of memory. For example, a memory controller may be configured to selectively load data to memory in response to a relatively slow latency seen with a type of flash memory region accesses, as well as other properties of the type of flash memory device, such as the limited write lifetime, limited number of reads between writes, and the relatively longer latency for erase and write operations. Applications that are associated with a more dynamic use of memory resources, for example, to implement an application-specific cache for I/O objects, may require a more extensive revision to the memory commands in order to support a hybrid main memory. In one example, a program associated with a more dynamic use of memory resources may be specifically configured to operate with certain symmetric (e.g., DRAM) memory characteristics, and thus, may have read/write access behaviors that are not well suited to asymmetric memory.

In some implementations, unmodified application programs (e.g., a program encoded in binary form) may be used with a hybrid DRAM/flash memory subsystem. In these implementations, the portion of the application code and data that are accessed in a read-only fashion and/or operations that are relatively tolerant of increased access latency, may be migrated over time in an adaptive fashion from DRAM memory regions into the flash memory regions in the main memory.

Figure 3A:
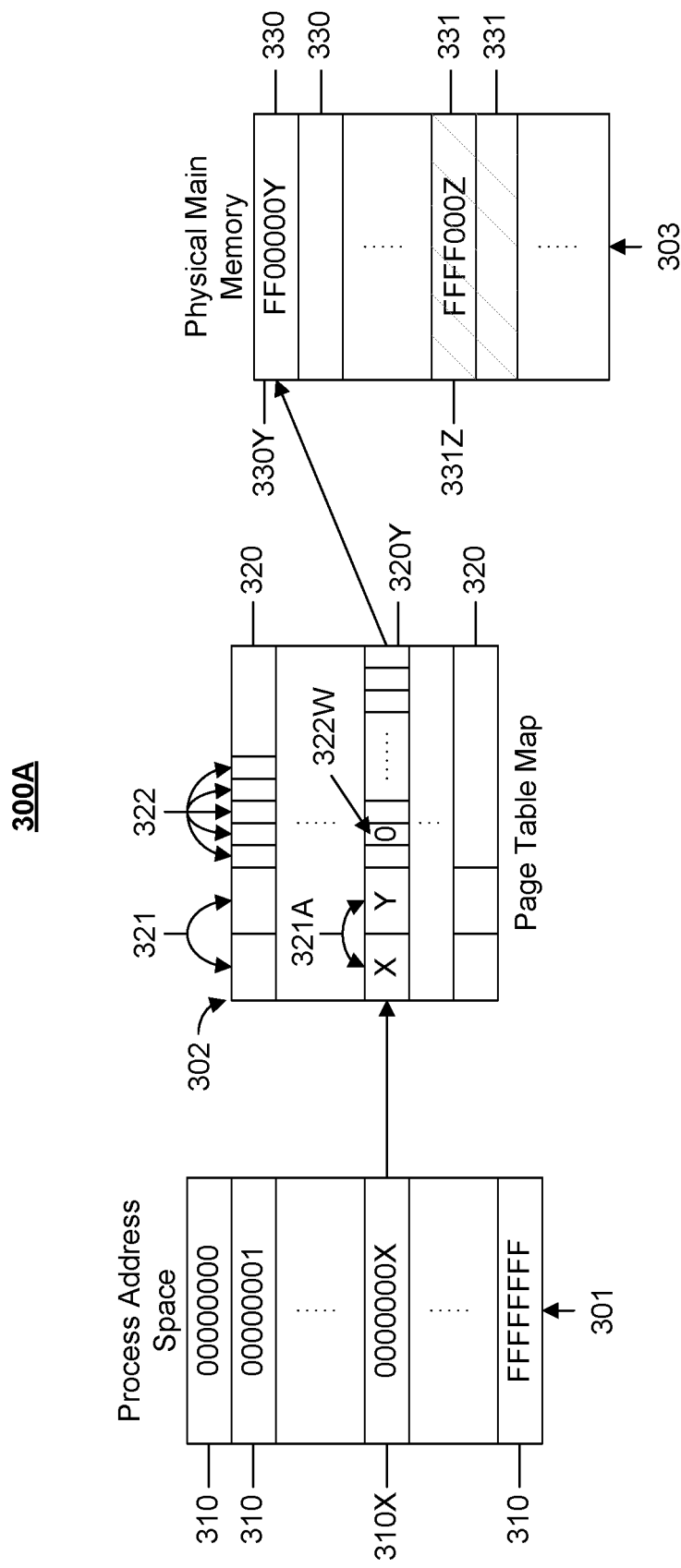
FIGS. 3A-3B are diagrams illustrating an example of mapping a virtual address space of an application running on a processor into a physical address space of a hybrid main memory using a page table map.

Referring now to FIG. 3A, a virtual address space or processor address space 301 may be mapped into a physical hybrid main memory 303 by a page table map 302. That is, a plurality of pages 310 associated with virtual addresses may be mapped to physical addresses of a plurality of physical pages in the hybrid main memory 303. The page table map 302 may include one or more page table entries (PTE) or slots (320A-320N) to map the virtual page address to the physical page address. The page table map 302 may be in a structure called the page table and may be maintained by the operating system. Page table map and page table may be referenced interchangeably.

Figure 5A:
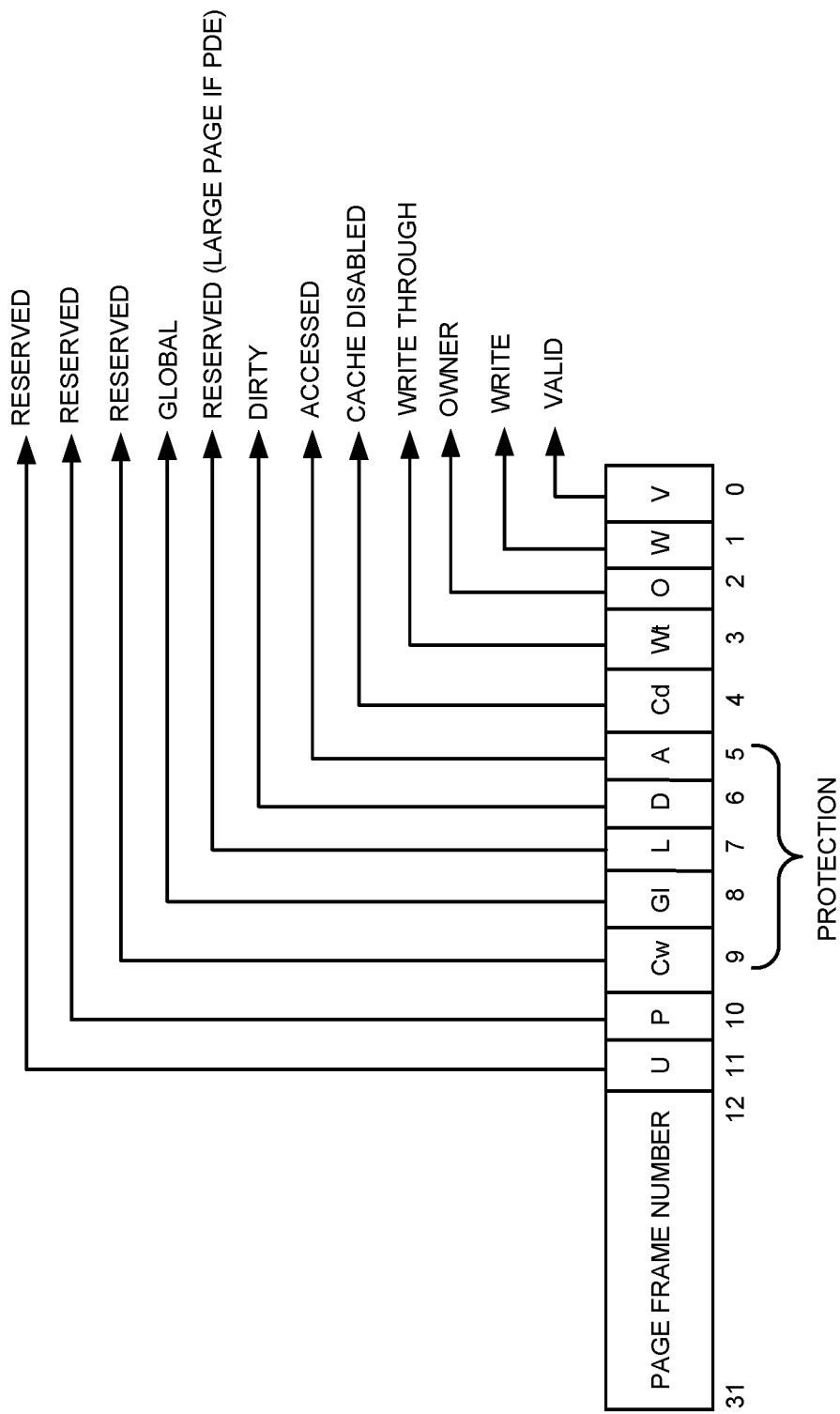
FIG. 5A is a diagram illustrating the bits and bit fields in a page table entry in a page table, which is illustrated as having 32 bits.

Each slot 320 in the page table map 302 may include a page frame number (PFN) 321 and one or more protection bits 322, one of which may be a write protection bit 322W that may be used to provide/signal page protection. The write protection bit controls whether CPU-initiated writes are allowed against virtual page locations corresponding to the page table entry. When set, writes are disallowed, resulting in an operating system or hypervisor level trap that enables software to exercise control over whether and how the write operation is performed. FIG. 5A shows other bits and bit fields that may be included in each slot 320 of an exemplary thirty-two bit wide PTE of page table map 302. In a 32-bit wide addressing scheme, bits 31-12 identify the page frame number. Bit 11 is reserved and writable on multiprocessor systems. Bits 10 and 9 are reserved. Bit 8 is a global bit, and bit 7 is used to identify whether the page is a large page. Bit 6 is a dirty bit identifier indicating whether the page has been written to. Bit 5 indicates whether the page has been read. Bit 4 indicates that the cache has been disabled, and bit 3 indicates that write through is supported to disable caching of writes to this page so that changes are immediately flushed to disk. Bit 2 indicates whether the user mode can access the page or whether the page is limited to kernel mode access. Bit 1 indicates whether the page is read/write capable or only readable, controlling whether the page is writable. Bit 0 indicates whether the translation maps to a page in physical memory.

Figure 5B:
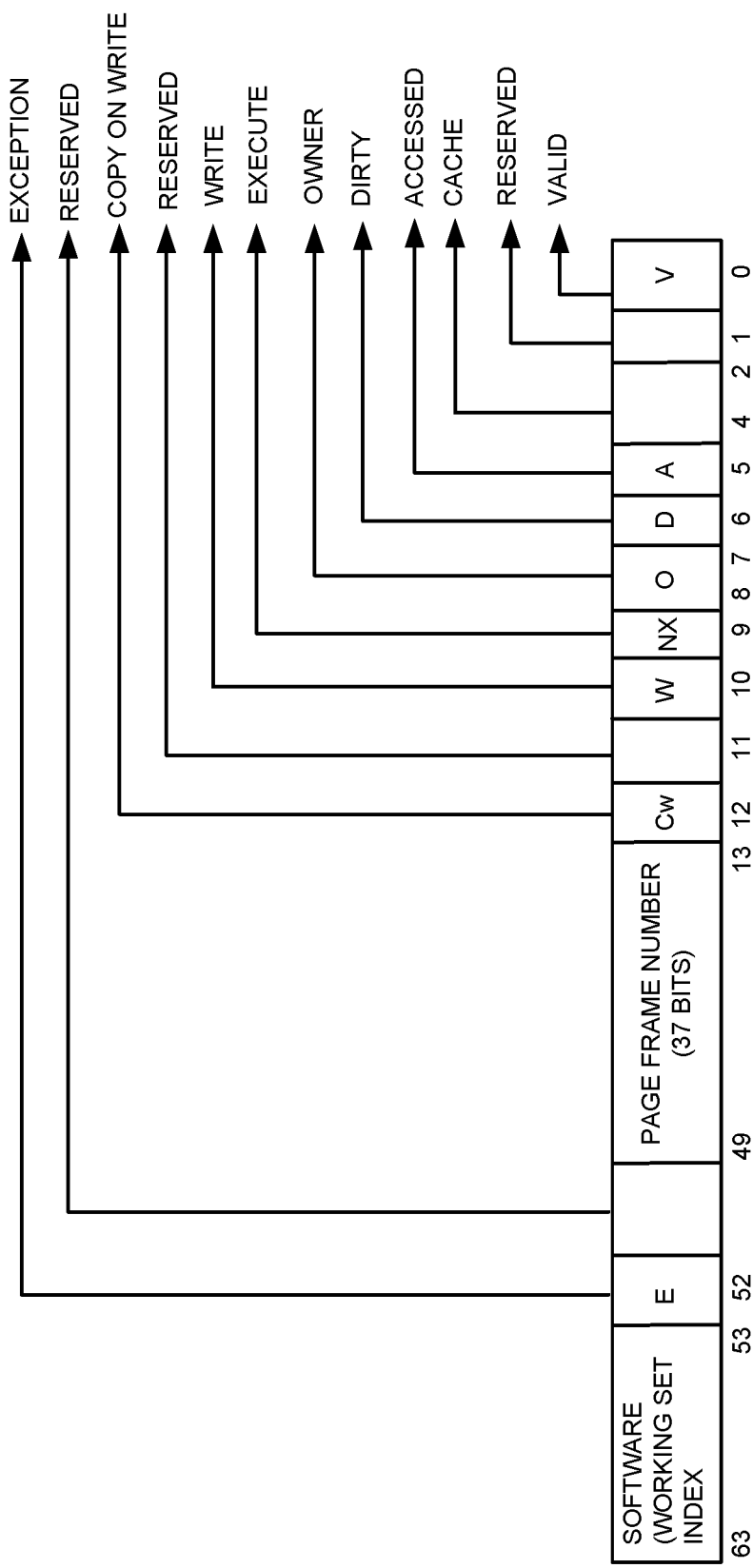
FIG. 5B is a diagram illustrating the bits and bit fields in a sixty-four bit slot or page table entry in a page table.

FIG. 5B is a diagram illustrating the bits and bit fields in a sixty-four bit slot or page table entry in a page table. In a sixty four bit wide addressing scheme, bits 63-53 are software representing a working set index. Bit 52 is used to indicate exceptions, and bits 51 and 50 are reserved. Bits 49-13 represent the page frame number. Bit 12 is used to indicate a copy on writes, and bit 11 is reserved. Bit 10 is used to indicate whether writes are allowed, and bit 9 is used to indicate the execute bit. Bits 8 and 7 indicate owner parameters specifying whether the user mode can access the page or whether the page is limited to kernel mode access. Bit 6 is a dirty bit indicating whether the page has been written to. Bit 5 is an access bit indicating whether the page has been read. Bits 4-2 indicate the cache parameters. Bit 1 is reserved and bit 0 indicates whether the page is valid or not.

Figure 3B:
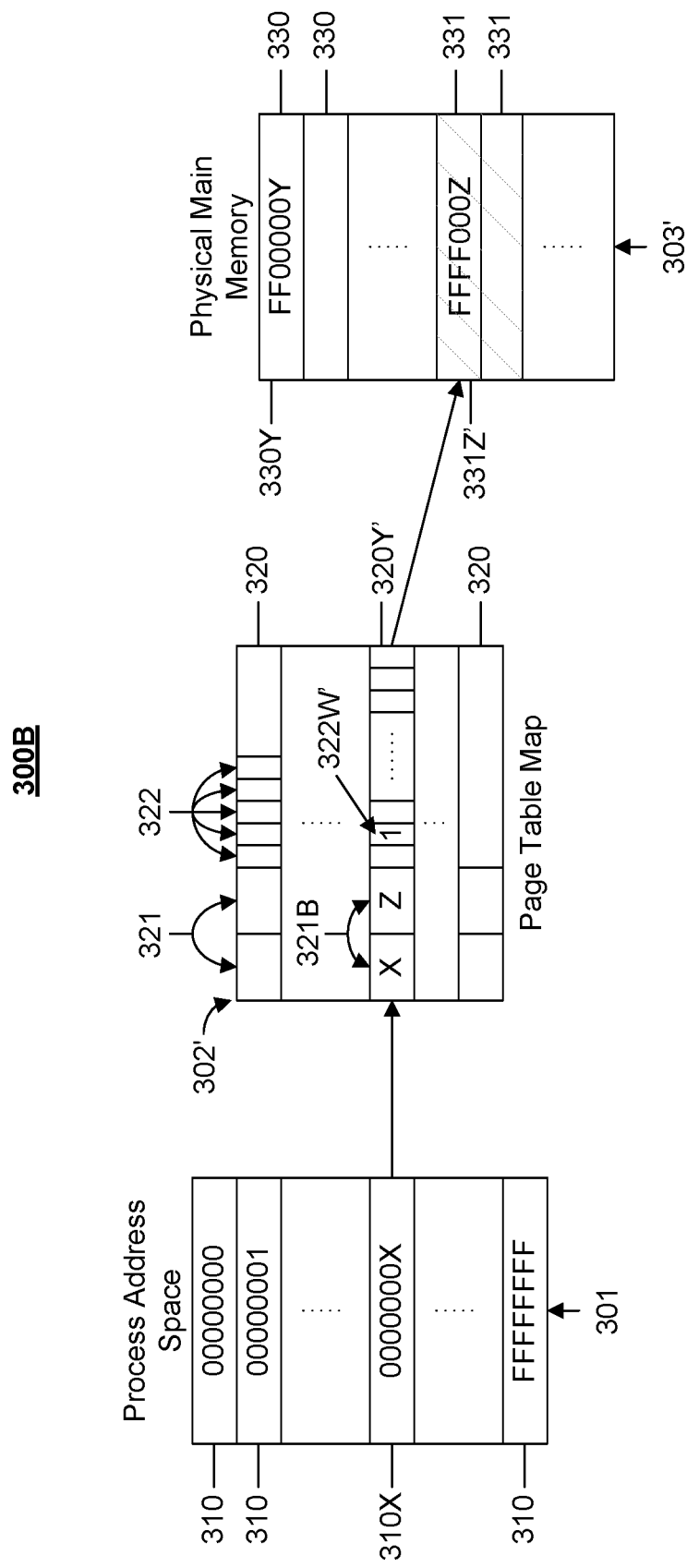

Referring now to FIG. 3B, the information in the DRAM memory page Y 330Y has been copied into the flash memory page Z 331Z', for example. In this example, the page frame number in slot 320Y' in the page table map 302' has been updated to page frame number 321B to translate the virtual page address 310X to point to the flash memory page Z 331Z'.

Figure 4:
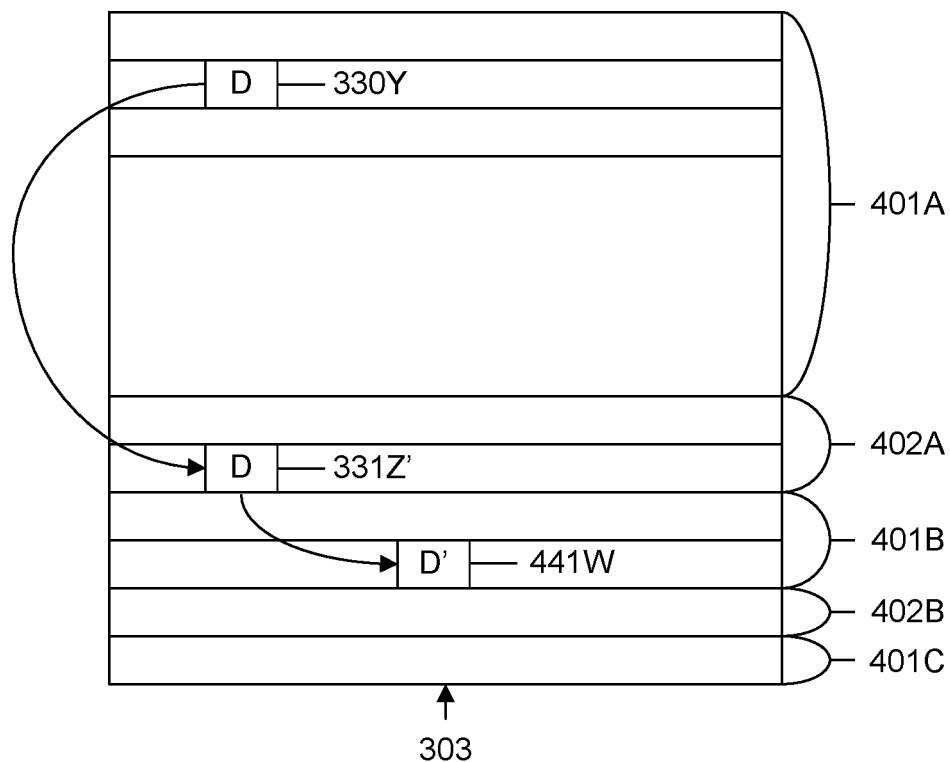
FIG. 4 is a diagram of main memory illustrating an example of migration of information between symmetric (e.g., DRAM) memory regions and asymmetric (e.g., flash) memory regions.

Referring to FIG. 4, consider, for example, a hybrid main memory 303 including one or more DRAM memory regions 401A-401C and one or more flash memory regions 402A-402B. A page 330Y of application code and/or data D may be stored in the DRAM memory region 401A of main memory 303 by an application program. A determination may be made that the page 330Y of application code and/or data D stored in the DRAM memory region 401A is to be read only or is relatively tolerant of an access latency increase. That is, a determination may be made that the page 330Y can be migrated from the DRAM memory region 401A into the flash memory regions 402A-402B of the main memory. In response, the application code and/or data D stored in page 330Y may be copied and written into a page 331Z' in the flash memory region 402A. The page 330Y in the DRAM memory region 401A may be thereafter freed and used for other purposes that require write access or that are less tolerant of access latency increases (e.g., the physical address for page 330Y may be put on a free list maintained by the operating system to indicate that it is unallocated to any process).

In another configuration, a memory controller (e.g., a code segment and/or silicon logic) may track access to pages of memory. The memory controller may determine that a particular page has been read a threshold number of times (e.g., ten times) within a monitored period without any writes. As a result of detecting more than a threshold degree of reads with less than a threshold degree of writes, the memory controller may determine that the particular page should be moved to asymmetric memory.

In some implementations, the usage of subregions in the application's virtual address space are periodically inspected to decide which subregions can be moved from DRAM memory regions to flash memory regions. The usage of the application's virtual address space may also be inspected to decide if there are memory subregions in the flash memory regions that should be moved back into the DRAM memory regions. For example, the memory controller may remove pages that are accessed less than a first threshold number of times (e.g. 7) in favor of pages that are accessed more than a second threshold number of times (e.g., 10). In one configuration, the first and second threshold number of times are identical. However, the first and second threshold number of times may differ to account for the cost of migrating content from a first storage system to a second storage system. In one implementation, a mechanism for remapping different data and code regions of the application virtual address space to different regions of physical memory (hence different devices) is employed and statistics are collected on the usage of these different regions as they are currently mapped into DRAM memory regions and flash memory regions in the hybrid main memory.

Examples of the statistics that may be inspected include the number or frequency of read and write operations performed in a time window, and/or an indication of whether a read and/or write threshold has been exceeded. Statistics also may be collected that indicate the degree of use for a portion of memory relative to the overall system constraints. For example, a system may record the memory utilization at the time that a portion of memory is accessed. The memory utilization then may be used in deciding whether a particular portion of content should be migrated. In one configuration where memory utilization is operating at high levels, and/or system limits, the server system may be configured to lower the thresholds at which data may be loaded to asymmetric memory. Alternatively or in addition, the server system may be configured to selectively lower the thresholds for those portions of memory that are most accessed during most demanding conditions.

In translating a virtual address to a physical address in physical memory, an additional translation hierarchy may be used in addition to the page table map 302 to provide additional addressable memory. The hierarchy may include page directories to point to page tables, page directory pointer tables to point to page directories, and a page map level table to point to the page directory pointer tables. However, the page table map 302 may be used to support the hybrid main memory at the lowest level of the address translation hierarchy.

In one initial default configuration, an application may be assigned by the page table map 302 to use DRAM memory pages 330 in the hybrid main memory 303. For example, a virtual page X of addressable memory 310X indexes into, relates to, or points to a slot 320Y in the page table map 302 to translate the virtual address into a physical address that points to a DRAM memory page Y 330Y in one of the DRAM memory regions of the physical hybrid main memory 303. In this example, the write protection bit 322W of the slot 320Y in the page table map 302 is set to zero to indicate that the DRAM memory page 330Y in the physical hybrid main memory 303 is both read and write accessible.

As the application continues to run, portions of the application text and data may be adaptively migrated into flash memory pages 331 in the flash memory regions of the physical hybrid main memory 303. This migration of information from DRAM memory pages 330 to flash memory pages 331 may be triggered by a periodic timer interrupt, for example. For example, the operating system or hypervisor may keep track of how often a memory block is being accessed during a window of time. At the conclusion of a timer, memory blocks whose counter is associated with the largest number of read operations may be added to or sustained within asymmetric memory. Alternatively, memory blocks whose read counter exceeds a threshold degree of read operations and whose write counter does not exceed a threshold degree of write operations may be added to or sustained within asymmetric memory. An interrupt handler invoked by the timer interrupt may also or alternatively examine access statistics of different application pages and identify those pages that have been accessed in a read-mostly fashion, and may also or alternatively identify those pages that can tolerate additional access latency. For example, a memory block that is accessed more than a first threshold number of times but less than a second threshold number of times may be identified as being a candidate for migration to an asymmetric portion of memory. Memory blocks that involve greater than a second threshold degree of use may be deemed sensitive to latency issues associated with asymmetric, and thus, a better candidate for symmetric memory. The interrupt handler may then relocate the information content stored in the identified DRAM memory pages to flash memory pages, as appropriate.

The relocation of the information content may be accomplished by allocating a flash memory page in the flash memory regions of the hybrid main memory 303, copying the information content of DRAM memory page into the flash memory page (e.g., reading the information content from the DRAM memory page and writing the information content into the flash memory page), and updating the corresponding slot in the page table mapping so that it now refers to the physical address of the flash memory page.

The process of information migration from DRAM memory regions to flash memory regions in a hybrid main memory may be implemented as a series of limited migrations over a period of time. As a result, the memory system may reach a steady state where most of the read-only pages of information have been mapped to locations in the flash memory regions and continue to reside there.

Additionally, a computing system may look at how memory is being used to determine if it can be migrated from DRAM memory regions into flash memory regions, or vice versa. That is, the computing system may evaluate accesses to the information stored in the DRAM memory regions of the hybrid main memory over certain periods of time. DRAM memory pages may be initially accessed in a read-write fashion (e.g., during data structure initialization time), and later be migrated as the content in these memory pages becomes more stable (subject to mostly read operations).

As discussed previously, the computing system may gather information about the accesses made to a virtual memory page over periods of time. The information gathered may include the number of reads and writes performed to a page over time, and the average inter-access time. This information may be used to identify DRAM memory pages that are being accessed in a read-only fashion during a given period of time and to determine whether or not the accesses are somewhat latency insensitive. A heuristic to approximate latency insensitivity may be to search for DRAM memory pages that have received fewer than a certain threshold number of accesses over a period of time.

The computer system may be configured to vary the migration between symmetric and asymmetric memory based on the degree of system constraints. For example, if it is determined that the computer system is operating in a constrained mode, as identified by memory and/or processor utilization statistics, a constrained configuration may be used in deciding how data is migrated between symmetric and asymmetric memory. More precisely, a constrained configuration may use lower thresholds in deciding whether to move data from symmetric memory to asymmetric memory. Alternatively, data may be automatically loaded to asymmetric memory upon an initial access. If it is determined that the computer system is operating in an unconstrained mode, the computer system may be configured to use an unconstrained configuration in deciding how data is migrated between symmetric and asymmetric memory. For example, the computer system may increase the thresholds used in deciding whether to migrate data to asymmetric memory in order to avoid component degradation and/or avoid performance issues related to write accesses to asymmetric memory.

Identifying a system as being constrained may be based on analysis of the overall memory system and/or based on the symmetric memory component within the memory system. In one configuration, a memory controller determines that limited or no free space exists in DRAM, or that DRAM space utilization is low relative to NOR flash space utilization. As a result, the memory controller may invoke a constrained configuration so that lower read thresholds are required before data is migrated to NOR flash. Alternatively or in addition, memory controller may adjust the time window used that tracks writes in considering whether data should be migrated to NOR flash. For example, the memory controller may require one unit of time to elapse without writes instead of eight units of time.

Detailed information about page accesses, particularly at the granularity of virtual memory pages, may not be readily available to gather statistical information of page accesses. A number of approaches may be used separately or together to obtain and gather statistical information of page accesses.

For example, the value of internal operating system or hypervisor counters tracking page reference history (e.g., reference bits, page age, etc.) for use by a page replacement algorithm may be periodically recorded as a snapshot of the page history. A plurality of the snapshots of the page history may be used to build a time-based history of the accesses to each page of memory.

In another example, the application software itself may be statically or dynamically invoked and executed periodically in order to collect information about its memory access behavior. Data in memory may be migrated in a static manner in response to an administrator or operating system launching a migration code segment or process, and using collected statistics to selectively migrate content from one storage area to another. In the static configuration, the migration code segment may be launched on a periodic basis (e.g., every 10 minutes) or as a result of receiving a discrete input (e.g., receiving an administrator command or upon detecting a threshold degree of utilization). In the dynamic configuration, the collected statistics may be continually monitored to decide whether a particular portion of data should be migrated. Still other configurations may use aspects of dynamic and static functionality. For example, a system administrator may allow a smaller degree of migration throughout a period of time as a result of monitoring the collected statistics. The system administrator then may schedule larger migrations at specified times, using, for example, lower thresholds in deciding whether to move content. Depending upon the software application being used, such a statistical page history collection mechanism may be used either in an offline scenario or in an online scenario. In an example in which the application software is to be invoked offline, the application may be run in a test environment to generate indications about which regions of the address space to migrate. Software tools can help in collecting statistical page history information by instrumenting program instructions to track memory access behaviors.

In some implementations, new or custom hardware may be generated and more direct approaches may be used to collect statistical page history information. For example, a number of counters may be used which are updated based on accesses into each memory module. The information stored in these counters is associated with the virtual page occupying the corresponding memory frame and is retrieved/reset in response to detecting page mapping changes.

In some implementations, in both the software and hardware approaches, access statistics at the granularity of virtual memory pages (not physical frames they reside in) may be used. These implementations may be used with a configuration where a virtual memory page gets swapped out to disk and back again.

In migrating information from DRAM memory regions into flash memory regions, a computer system may be configured with the aspiration that recently-migrated content may be maintained in the newly-resident location for a specified period of time or number of cycles. Unless other intervening acts are detected to interrupt this configuration (e.g., receiving a write for a virtual address that maps to the asymmetric memory component), specifying a minimal duration may include specifying a duration in response to determining a cost incurred as a result of the migration. For example, costs may be incurred as a result of migrating the information, including the overhead associated with the statistics collection mechanisms (e.g., space, area, and time). Other costs may include the cost of executing the operating system protection fault handler, and the cost of copying the information from a DRAM memory region into the flash memory region.

In one configuration where a two to four microsecond cost is incurred for each protection fault that occurs, a DRAM memory page may be migrated when the DRAM memory page is determined to have read-only accesses and that the DRAM memory page is determined to be likely to remain in a read-only access mode in the future. For example, a portion of a search index that is determined to be only updated at specified intervals may be migrated to asymmetric memory.

Heuristics may be developed to effectively predict future access patterns based upon the statistical page history information seen in the past. The heuristics may be relatively tolerant to sudden changes in application behavior (e.g., a dormant page that suddenly receives a burst of activity). Combining knowledge about the nature of memory regions (text, data, mmap-ed, etc.) and the specific access statistics together enables a predictor with better precision and recall. For example, a memory controller may be configured to identify a burst as more than ten read accesses in an observation period. The memory controller may be configured to migrate data to asymmetric memory in response to determining that five read accesses have occurred after a burst. Configuring the memory controller to use burst and other atypical thresholds enables the memory controller to perceive application behavior in a manner that accounts for atypical behavior that may otherwise distort results.

Figure 6:
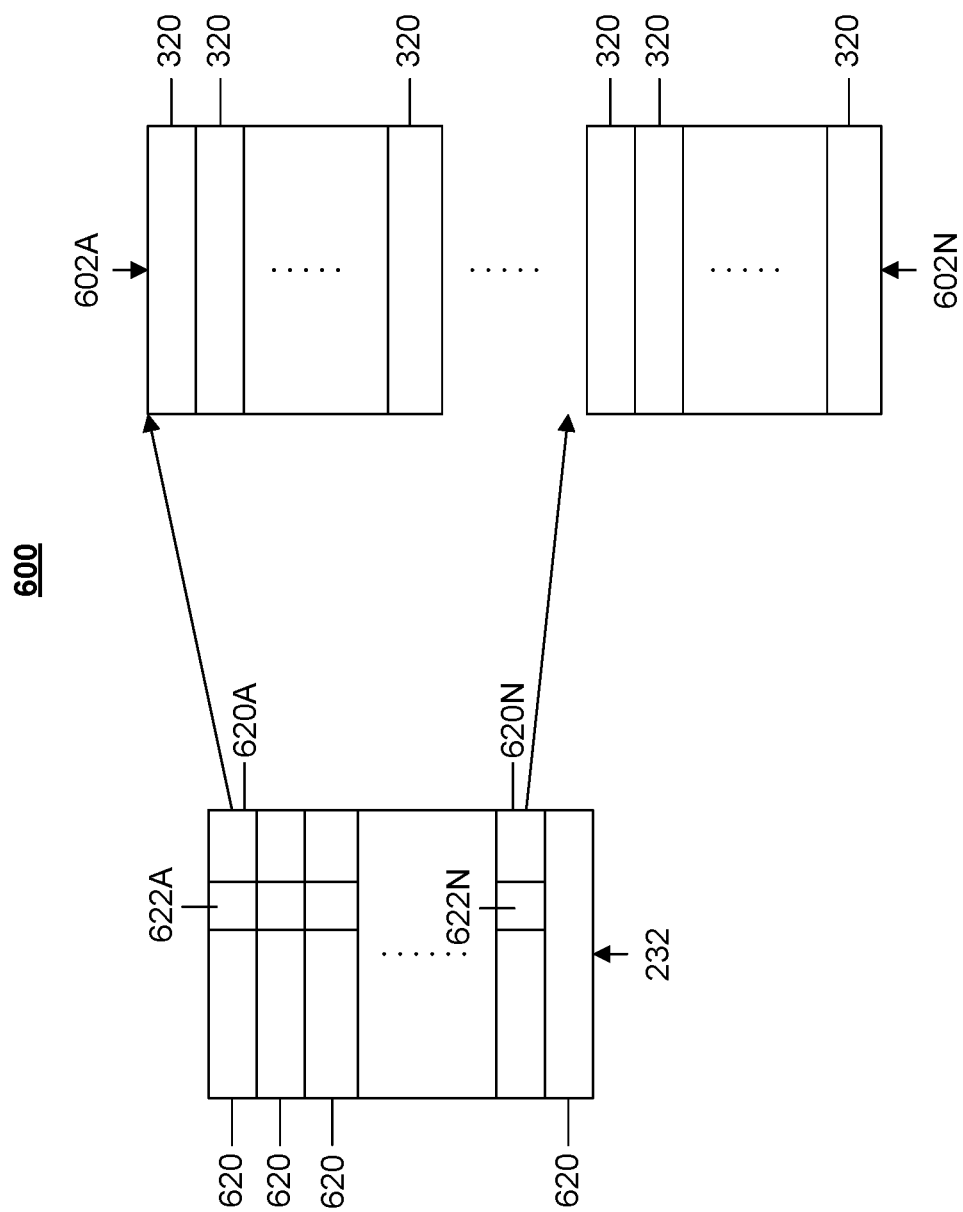
FIG. 6 illustrates a multilevel mapping of virtual address space of an application running on a processor into a physical address space of a hybrid main memory by means of a kernel page table map.

FIG. 6 illustrates a multilevel mapping 600 of virtual address space of an application running on a processor into a physical address space of a hybrid main memory by means of a shadow page table map. More precisely, and also referring back to FIG. 2, the hypervisor 104 maintains a shadow page table 222 to that of the page table 122 maintained by the operating systems in order to map virtual addresses of applications running under the control of one or more host operating systems to physical addresses in main memory 135. The shadow page table 222 in the hypervisor 104 is similar to the page table 122 maintained by the one or more host operating systems 102. However, in multilevel mapping 600, the hypervisor 104 alters the bits in the shadow page table 222.

The hypervisor supports executing one or more copies of a host operating system to provide the illusion of enabling multiple virtual machines on one physical machine. The hypervisor manages the allocation of raw hardware resources, including main memory, amongst the one or more virtual machines.

The shadow page table 222 in the hypervisor 104 is similarly managed as the page table 303 discussed previously to migrate information in DRAM memory regions into flash memory regions of a main memory. That is, the shadow page table 222 has its page table entries updated as information in DRAM memory pages are copied into flash memory pages and vice-versa. The hypervisor 104 also changes the write protection bits in the slots of the shadow page table 222 to protect the corresponding mapped flash memory pages from being written.

In one configuration, the hypervisor trap 225 works in conjunction with the kernel page table (KPT) 232 maintained by the hypervisor 104. In this configuration, the kernel page table 232 has one or more slots or page table entries 620 that point to the physical address for each process page table 602 of each respective operating system of each respective virtual machine maintained by the hypervisor. For example, entry 620A points to the process page table 602A for a first operating system of a first virtual machine. Entry 620N points to the process page table 602N of the Nth operating system of the Nth virtual machine. Each process page table 602 has page table entries 320 to map virtual addresses to physical addresses. For an operating system to allocate or modify a process page table 602, it ends up passing control to the hypervisor via with the kernel page table 232. Before the operating system can allocate or modify a process page table 602, the hypervisor trap 225 traps the instruction that wants to update information located in certain locations of the page table.

Upon initial allocation, the hypervisor allocates a process page table to a given operating system but prevents it from being written to by the operating system. This prevents the operating system from changing the bits in the process page table. In this configuration, this behavior is achieved as follows. Each slot or entry 620N in the kernel page table 232 includes a protection bit 622N to protect its associated process page table 602N from being written.

In one configuration, the DRAM memory resources freed up because of the migration of information from a page in a DRAM memory region to a page in the flash memory region of the hybrid main memory may be used by the hypervisor to support the memory requirements of other virtual machines. In a second configuration, these freed resources may be made available for use by the virtual machine from which they were recovered by dynamically expanding the memory allocation initially configured for that machine.

Figure 7:
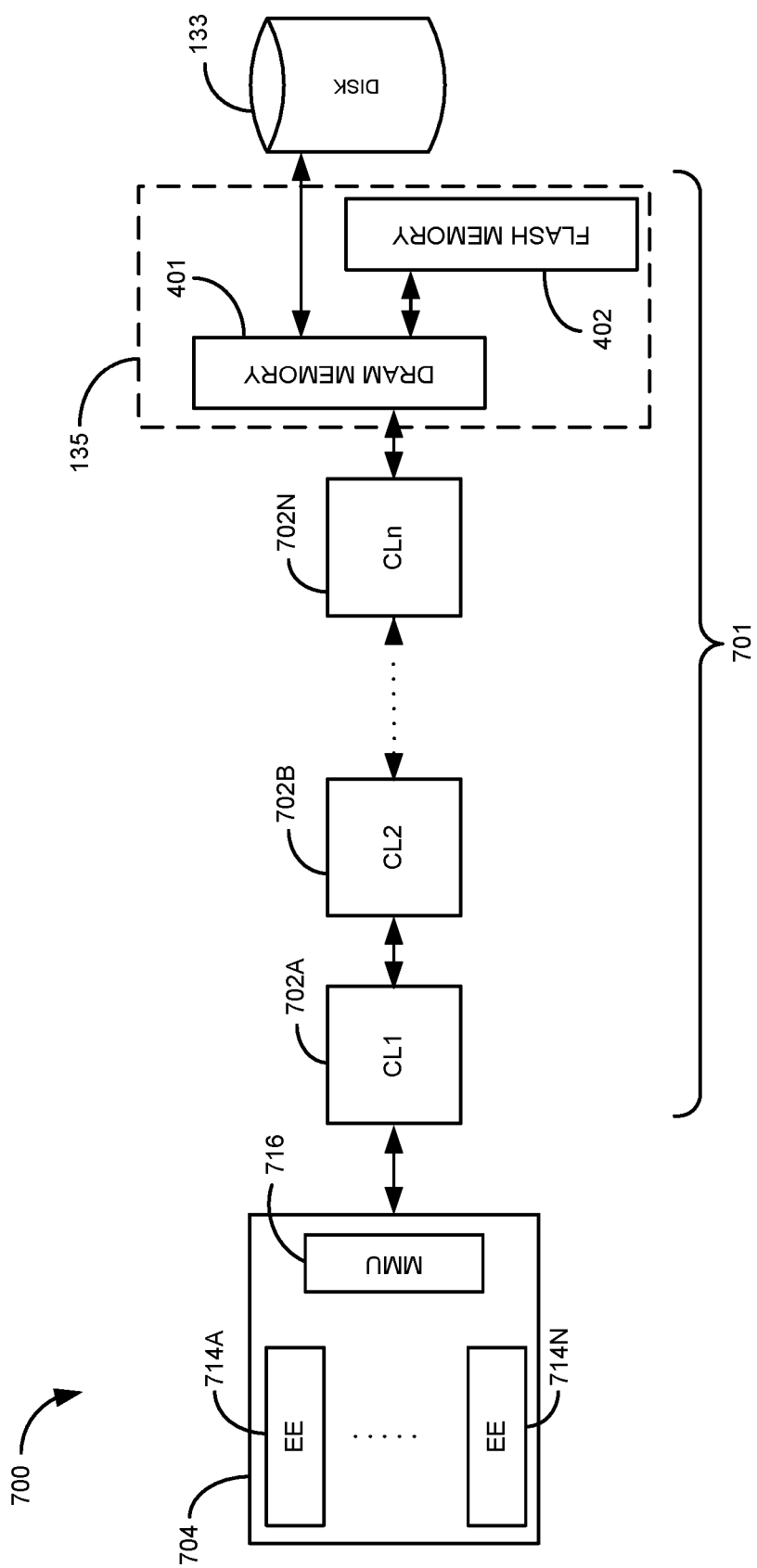
FIG. 7 is a block diagram of a computer system illustrating a memory hierarchy.

Referring now to FIG. 7, a virtual memory hierarchy 701 for a computer system 700 is illustrated between a processor core 704 and hard disk storage 133. The processor core 704 may be a multiprocessor core including one or more execution engines 714A-714N. The memory hierarchy 701 may include one or more levels of cache memory 702A-702N and a hybrid main memory 135 with DRAM memory regions 401 and flash memory regions 402. Additionally, a computer system may have more than one processor core, each associated with its own levels of cache memory 702A-702N and possibly its own hybrid main memory 135. In one configuration, the memory closest or nearest to the processor (the fastest memory) has the fastest access times while the memory furthest from the processor (the slower memory) has slower access times.

A memory management unit 716, integrated with or separate from the processor core 704, working in cooperation with the operating system may bring forward pages of information associated with addresses in an application's virtual address space into main memory 135 to allow the execution engines to actively process this information. That is, the memory management unit 716 may page information by reading pages of information from the hard disk storage 133 into the main memory 135. Additionally, portions of the information may be brought forward into one or more levels of the cache memory 702A-702N. A valid bit in each slot in the page table corresponding to the page of memory is set to indicate a valid page in memory. If the page of information is no longer needed in main memory, the valid bit is cleared so that page of memory may be reused. If the page of information was updated, indicated by the setting of a dirty bit, the page of information may be written into the hard disk storage 133 by the operating system.

As the hard disk storage 133 may maintain a copy of each page in the memory hierarchy 701, the computer system may be configured so that pages of information in the memory hierarchy 701 are not pushed back down to slower memory in the memory hierarchy. However in implementations having a hybrid memory 135, pages of information may be pushed down the memory hierarchy 701 from DRAM memory regions 401 in the main memory, which may be a faster memory type, into flash memory regions 402 in the main memory, which may be a slower memory type while retaining its direct addressability in memory. Moreover, the hybrid main memory 135 has two different types of memory pools that are managed by the operating system or hypervisor, flash type memory regions and DRAM type memory regions. The DRAM type memory regions may be readily read-writeable. In contrast, the flash type memory regions may be readily readable but it is desirous to write infrequently into flash memory due to a slower write access time and the possibility of flash memory wear out.

D. Discussion of Operations Performed and Additional Configurations

Figure 8:
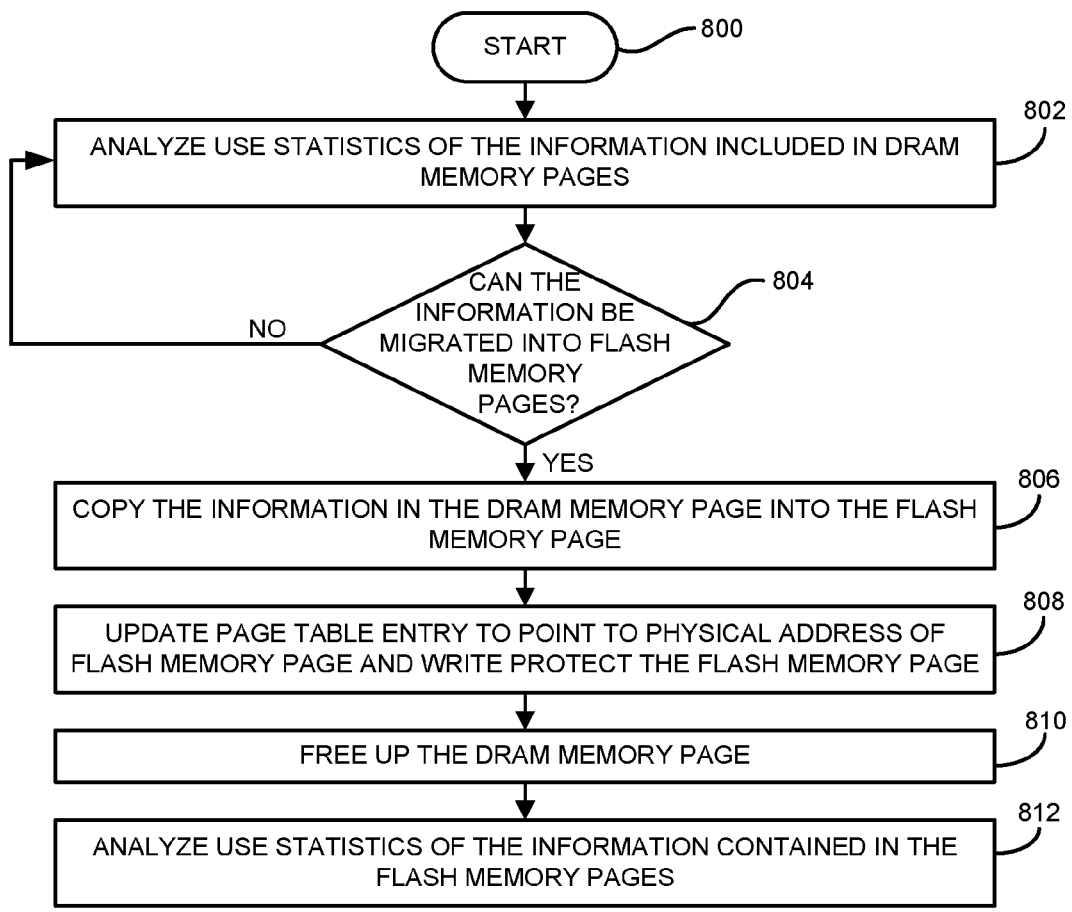
FIG. 8 is a flow chart of a high level process by which data is selectively and intelligently loaded to an asymmetric memory component.

Generally, FIGS. 8-12 include flow charts of processes by which a memory controller manages a hybrid memory system that includes asymmetric memory components (e.g., NOR flash memory). In particular, FIG. 8 relates to a high level process in which a memory controller determines whether some region of the virtual address space can be migrated into asymmetric memory components. In contrast, FIGS. 9-10 and 11-12 illustrate more detailed processes by which an operating system and a hypervisor, respectively, use access characteristics in deciding whether to move virtual address to asymmetric memory components. Referring now to FIG. 8, a flow chart illustrates a high level process of managing a hybrid main memory that includes flash memory. The method starts at process 800 and then goes to process 802.

At process 802, use statistics of information included in DRAM memory pages are collected and analyzed. The use statistics can be used to identify DRAM memory pages including information that is substantially accessed in a read-only fashion during a given period of time and estimate whether or not the accesses are somewhat latency insensitive. Then at process 804, a determination is made if one or more pages of information in the DRAM memory pages can be migrated into flash memory pages within the hybrid main memory. For example, the computer system may determine that a particular virtual address has been accessed more than a threshold number of times. If not, the process loops back to process 802 where an analysis of the use statistics of information in DRAM memory pages continues. If one or more pages of information in DRAM memory pages can be migrated, the process goes to process 806.

At process 806, the one or more migratable pages of information in DRAM memory pages are copied into one or more flash memory pages of the hybrid main memory.

Then at process 808, page table entries initially pointing to the one or more migratable page of information in DRAM memory pages are updated to point to the one or more flash memory pages in the hybrid main memory that include the one or more migratable pages of information.

Then at process 810, the one or more DRAM memory pages that previously stored the one or more migratable pages are freed up so that they can be used to store other information. At process 812, use statistics of information included in flash memory pages are collected and analyzed. The flash memory use statistics can be used to identify flash memory pages that include information that needs to be updated or re-written. For example, the computer system may collect usage statistics to confirm that migrated pages continue to be accessed. In particular, the computer system may be configured to determine whether the migrated pages continue to be read more than a threshold number of times in order to remain in asymmetric memory. Note that process 812 also may be accessed directly from process 800 and may operate independently of processes 802-810.

Figure 9:
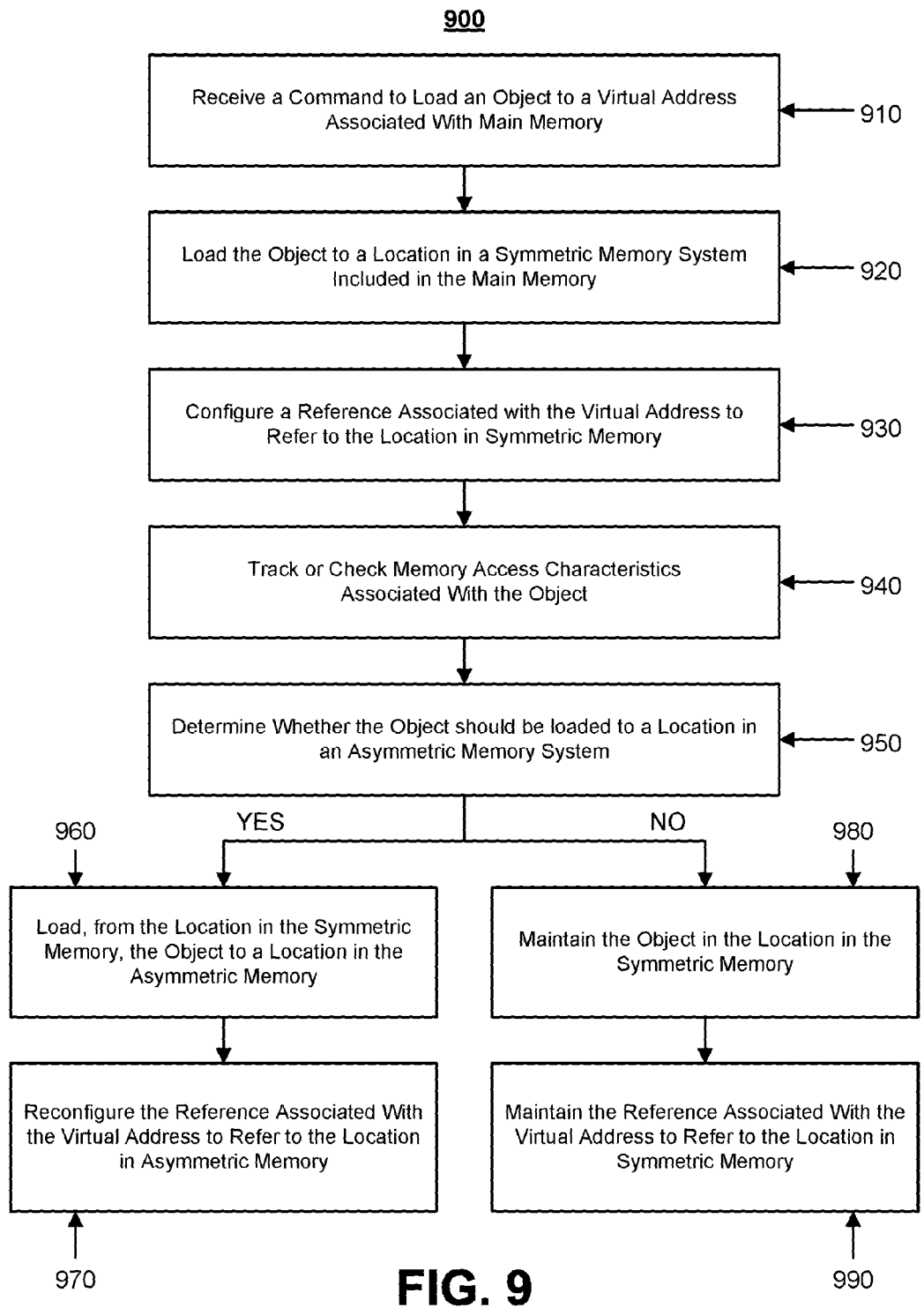
FIG. 9 is a flow chart of a process by which data is selectively and intelligently identified as being suitable for storage in an asymmetric memory component using an operating system.

FIG. 9 is a flow chart 900 of a process by which data are selectively and intelligently identified as being suitable for storage in an asymmetric memory component using an operating system. More precisely, flow chart 900 illustrates how access characteristics are used to determine whether an object should be loaded to asymmetric memory, or whether the object should be maintained in symmetric memory. Although the operations are described generally with respect to a memory controller, other configurations may be used to perform the operations described in flow chart 900. For example, the operations may be performed using an operating system that acts as a memory controller, a hypervisor, a dedicated memory controller chip, or logic and software within the memory component packaging (e.g., within a NOR flash DIMM ("Dual Inline Memory Module")).

Initially, the memory controller receives a command to load an object to a virtual address associated with main memory (910). Receiving a command to load an object to a virtual address may include receiving a command from a CPU to load a particular value to a MMU-specified physical address.

The memory controller loads the object to a location in a symmetric memory system included in the main memory (920). For example, an object may be generated by an application, retrieved from a system across a communications network and/or retrieved from a location outside of the main memory (e.g., a disk). Loading the object to the location in the symmetric memory system may include executing a random-access write instruction to the virtual address. The memory controller configures a reference associated with the virtual address to refer to the location in symmetric memory (930). For example, a memory controller may associate the virtual address with a symmetric memory physical address.

The memory controller tracks (or checks) access characteristics associated with the object (940). For example, the memory controller may maintain one or more counters for each virtual address. A first counter may track how often a virtual address is accessed using a read operation. A second counter may track how often a virtual address is written to using a write operation. Hardware logic may automatically update counters in a page table whenever a read (or write operation) is performed. The counters may be time based, that is, the counters may be periodically reset to track how often a virtual address is referenced in a designated time window.

As a result of tracking (or checking) memory access characteristics associated with the object, the memory controller determines whether the object should be loaded to a location in an asymmetric memory system (950). In one configuration, the memory controller is configured to automatically load the most accessed objects (e.g., most read addresses) to asymmetric memory. Depending on the granularity supported by the memory controller, the memory controller may be configured to load the M-most accessed pages, or the N-most accessed portions of data (e.g., blocks, banks, or sectors), where M and N represent a number. The memory controller may be limited by (1) the granularity at which the page table can translate a virtual address to a physical address in asymmetric memory, and (2) the granularity at which the CPU can access a virtual address. In the first instance, the memory controller may be limited to performing page level translations, that is, between a virtual address specifying a page and a physical address specifying a page. In the second instance, greater read granularity may be specified using an offset within a page to permit entry level access to one or more words while write granularity may be regulated by the internal structure limiting the manner in which content may be retrieved from the asymmetric memory component. Alternatively or in addition, the memory controller may be configured to determine whether the object has been read a first threshold number of times (e.g., been read ten times) and written to (or updated) less than second threshold number of times (e.g., less than twice). Having determined that a page is suitable for storage in the asymmetric memory component, the memory controller may elect to wait for a batch of eligible pages to become available for migration so that the disruptive effect of writing to asymmetric memory may be ameliorated.

In response to determining that the object should be loaded to a location in the asymmetric memory system, the object is loaded to a location in asymmetric memory (960). Thus, the memory controller may be configured to migrate the object by reading the object from symmetric memory, and writing the object to an asymmetric memory component. The memory controller then reconfigures the reference associated with the virtual address to refer to the location in asymmetric memory (970). For example, a page table may be modified to reflect the location of the object in asymmetric memory. The page table may now associate the virtual address with an asymmetric memory physical address.

In some types of asymmetric memory (e.g., NOR flash), writing to asymmetric memory may require a block of content to be written. That is, writing to NOR flash may require an entire sector (e.g., 4 kb) in a NOR flash bank to be written. The update to the virtual address may only represent a fraction of the entire area affected by the block write. The memory controller may be configured to queue up different writes until a threshold amount of data has been identified to be written to a particular region of memory (990).

In response to determining that the object should not be loaded to a location in the asymmetric memory system, the object is maintained in symmetric memory (980). The memory controller then maintains the reference associated with the virtual address to refer to the location in symmetric memory (990).

Figure 10:
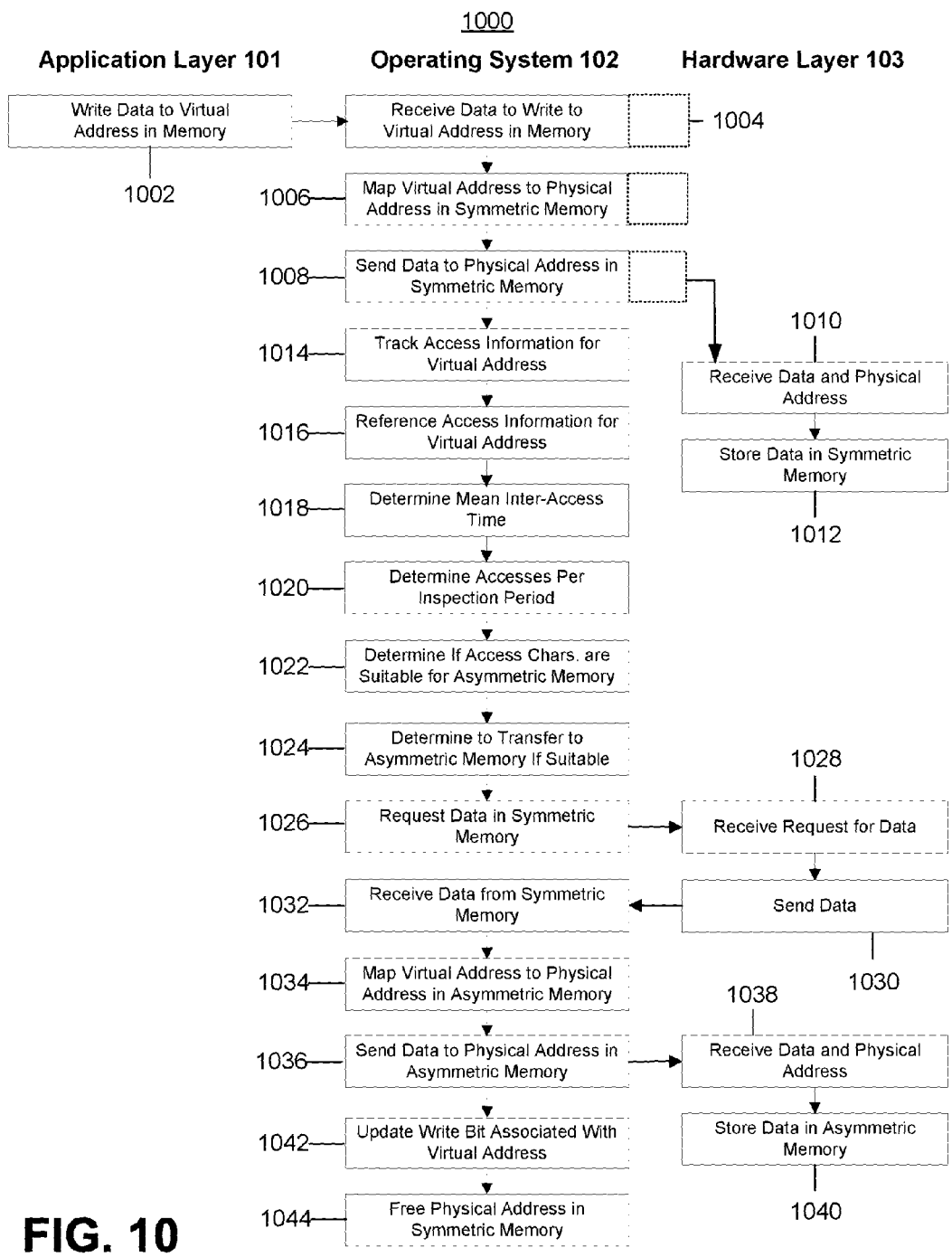
FIG. 10 is a flow chart of a process by which data is selectively and intelligently loaded to an asymmetric memory component using an operating system.

FIG. 10 is a flow chart 1000 of a process by which data is selectively and intelligently identified as being suitable for storage in an asymmetric memory component using an operating system . . . . Initially, the application layer 101 writes data to a virtual address in memory (1002). For example, the application layer 101 may include a search application attempting to generate or modify a search index. The operating system 102 receives the data to write to the virtual address in memory (1004). For example, the operating system 102 may receive a command to store a portion of a search index in memory.

The operating system maps the virtual address to the physical address in symmetric memory (1006). That is, the operating system 102 may be configured to maintain physical addresses for symmetric and asymmetric memory. The operating system 102 sends the data to a physical address in symmetric memory (1008). Although a number of operations may be performed using software and/or hardware operations, operations 1004, 1006, and 1008 have been modified to reflect the optional close integration with the hardware layer 103 that may be performed. The hardware layer 103 receives the data and the physical address (1010), and stores the data in symmetric memory (1012).

The operating system 102 tracks access information for the virtual address (1014). For example, the operating system may determine in what manner (e.g., reads and writes) and how often a virtual address is accessed. The operating system 102 then references access information for the virtual address. For example, the operating system 102 may inspect access information in response to receiving a request to access the virtual address. The operating system may be configured to use the access instructions (e.g., reads and/or writes) as triggering events to determine where the data should be stored. Alternatively or in addition, the operating system 102 may intermittently inspect the access information, such as for example, by inspecting every access command in a specified reconfiguration window or by periodically inspecting the entire page table.

The operating system 102 determines the mean inter-access time (1018). For example, the operating system may determine that a particular piece of data is read on average every Nth unit of time (100 milliseconds). The operating system determines the number of accesses in an inspection period (1020). For example, the mean inter-access time may be calculated across multiple inspection periods, and be used to provide an indication of the sustained demand for the data. In contrast, the number of accesses in an inspection period may be used to provide an indication of the immediacy of the demand for the data.

The operating system 102 determines if the access characteristics are suitable for use in asymmetric memory (1022). For example, the operating system 102 may determine that a piece of data has been read more than a threshold number of times and not been written to during an inspection period. The operating system 102 may be configured to identify an increased number of reads without performing a write operation as a suitable candidate for migration to asymmetric memory because the likelihood of incurring a performance penalty caused by writes is reduced. As a result of determining that the data is suitable, the operating system 102 determines to transfer the data to asymmetric memory (1024).

The operating system 102 then requests the data from symmetric memory (1026). For example, the operating system may request to read the data from DRAM memory. The hardware layer 103 receives the request for data (1028), and sends the data to the operating system 102 (1030). The operating system 102 receives the data from the symmetric memory (1032) and maps the virtual address for the data to a physical address in asymmetric memory (1034). That is, the operating system 102 may receive a requested object from DRAM and configure the virtual address for the object to be associated with a physical address in NOR flash memory instead of DRAM. The operating system 102 then sends the data to the physical address in asymmetric memory (1036). Alternatively, the memory controller may reverse the order of operations 1034 and 1036. For example, the operating system may transmit the data to a NOR flash component. The hardware layer 103 receives the data and the physical address (1038) and stores the data in asymmetric memory (1040). The data may be written to a sector in NOR flash as part of a block write.

The operating system 102 then updates the write bit associated with the virtual address (1042). For example, the write bit may be set so that the operating system may specially process subsequently-received write instructions to the asymmetric memory. The operating system 1002 then frees physical address in symmetric memory (1044).

Figure 11:
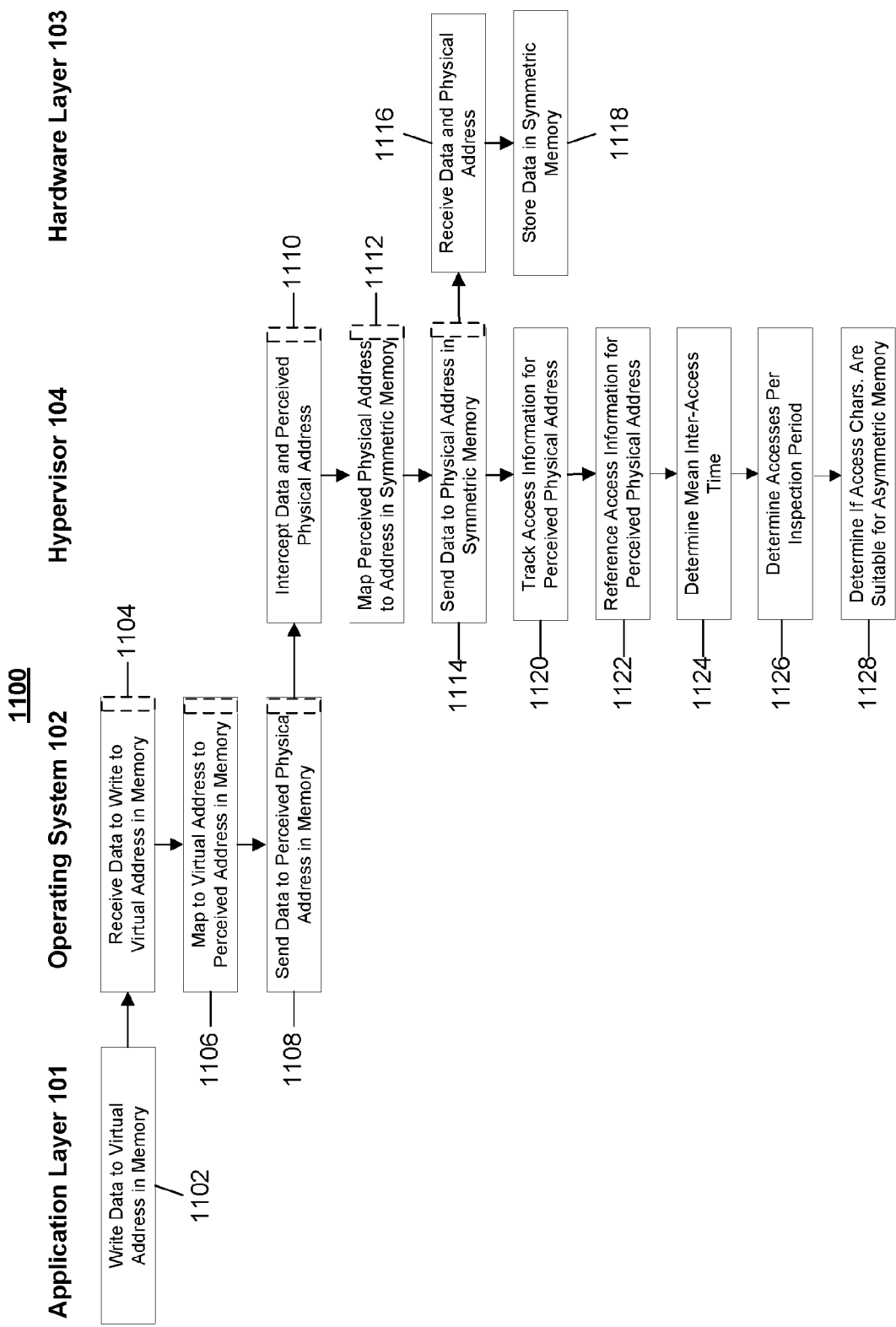
FIG. 11 is a flow chart of a process by which data is selectively and intelligently identified as being suitable for storage in an asymmetric memory component using a hypervisor.

FIG. 11 is a flow chart 1100 of a process by which data is selectively and intelligently identified as being suitable for storage in an asymmetric memory component using a hypervisor. Initially, the application layer 101 writes data to a virtual address in memory (1102). For example, the application layer 101 may generate a new record. The operating system 102 receives the data to write to the virtual address in memory (1104) and maps the data to virtual address to perceived address in memory (1106). For example, a server may include an intermediary memory controller (e.g., a hypervisor) that implements a layer of abstraction between the physical addresses perceived by the operating system 102, and the actual physical addresses where data is stored. The operating system then sends data to the perceived physical address in memory (1108). A hypervisor 104 intercepts the data and the perceived physical address (1110). That is, a hypervisor acting as a software-based intermediary memory controller between the CPU (and application layer 101 and/or operating system 102) may receive the data that is sent to the perceived physical address from the operating system 102. The hypervisor 104 maps the perceived physical address to a physical address in symmetric memory (1112). The hypervisor may maintain a page table that maps perceived physical addresses (e.g., physical addresses visible to the operating system 102) with hypervisor-specified physical addresses that represent the physical addresses for the actual memory components.

The hypervisor 104 sends the data to the physical address in symmetric memory (1114). The hardware layer 103 receives the data and the physical address (1116), and stores the data in symmetric memory (1118). The hypervisor layer 104 tracks access characteristics for the perceived physical address (1120). For example, the hypervisor layer 104 may interface with circuitry that automatically updates counters based on when and how the perceived physical address is accessed. Thus, reading a particular perceived physical address may automatically increase the counter associated with the perceived physical address.

The hypervisor 104 references access information for the perceived physical address (1122) and determines the mean inter-access time (1124) and the total number of accesses per inspection period (1126). The hypervisor may be configured to monitor access over a period of time (the inspection period) in order to track how different objects associated with perceived physical addresses are being used. For each record, the hypervisor 104 may maintain a first value representing the mean inter-access time across multiple periods and a second value representing the total number of accesses per time period. The hypervisor 104 then may determine if access characteristics are suitable for asymmetric memory (1128). The hypervisor may include logic that automatically sorts records based on the tracked access characteristics, and use the logic to identify which objects are suitable for storage in asymmetric memory. In one configuration, the logic generates a page table ordering that sorts content by the total number of read operations per perceived physical address without a write. In another configuration, the logic assigns equal weights to mean inter-access time and total accesses per inspection period. The combined weighting then may be used in association with information related to write performance to identify which information should be loaded to asymmetric memory. Similar to the special graphical designation used in FIG. 10, a box with a dotted line has been added to operations 1104, 1106, 1108, 1110, 1112, and 1114 to indicate those operating system and hypervisor operations that may feature optional close integration with the hardware layer 103. For example, operation 1104 ("Receive Data to Write to Virtual Address in Memory") may include a hardware interface so that a memory table may automatically exchange address information with the asymmetric memory component.

Figure 12:
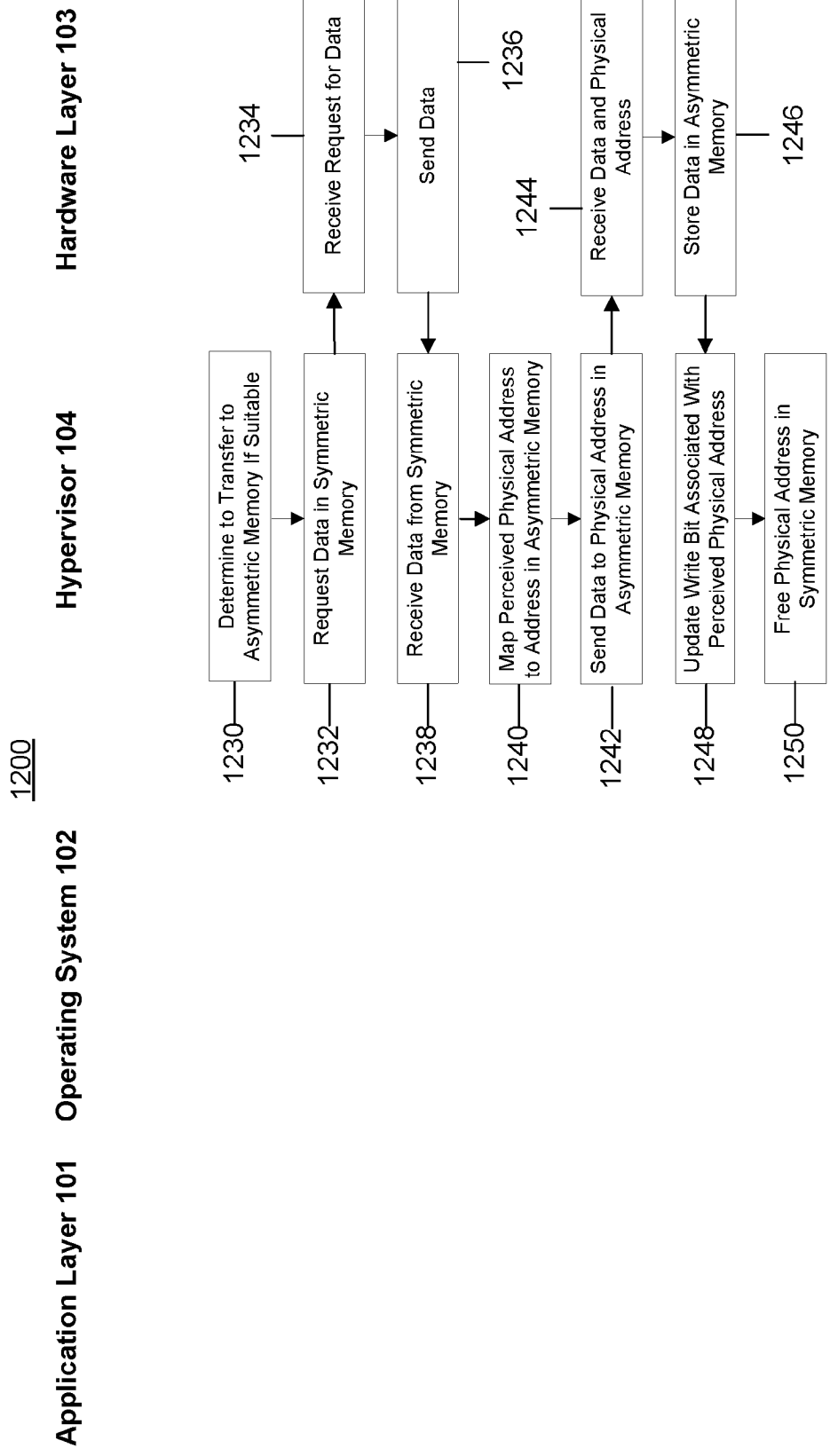
FIG. 12 is a flow chart of a process by which data is selectively and intelligently loaded to an asymmetric memory component using a hypervisor.

Flow chart 1100 illustrates the logic used in deciding whether to load data to asymmetric memory. FIG. 12 is a flow chart 1200 of a process by which data is selectively and intelligently loaded to an asymmetric memory component using a hypervisor .... The operations shown in flow chart 1100 and 1200 should be seen as complementary operations in that the operations shown in flow chart 1200 are designed to benefit from operations previously performed in flow chart 1100 in deciding whether to load the data to asymmetric memory.

Initially, the hypervisor 104 determines to transfer the data to asymmetric memory if the access characteristics for the data are suitable (1230). The hypervisor 104 may be configured to periodically inspect a page table in the hypervisor layer in order to migrate eligible (or best candidates) data to asymmetric memory. The hypervisor 104 requests the data in symmetric memory (1232) from the hardware layer 103, which receives the request (1234), and sends the data to the hypervisor 104 (1236). The hypervisor 104 receives the data from symmetric memory (1238), and maps the perceived physical address to the asymmetric memory physical address (1242). Mapping the perceived physical address may include identifying an available location in asymmetric memory and identifying a physical address for the available location in asymmetric memory. The identified physical address then is associated with the perceived physical address so that subsequent access to the perceived physical address references the data residing in asymmetric memory.

The hypervisor 104 sends the data to the asymmetric memory physical address in the hardware layer 104, which receives the data and the asymmetric memory physical address (1244). The hardware layer 103 stores the data in asymmetric memory (1246). The hypervisor layer 104 updates the write bit associated with the perceived physical address (1248) and frees the physical address space previously used in symmetric memory (1250).

Although some of the operations were described as being performed by a hypervisor implemented as software, the hypervisor (or indeed the memory controller generally) also may be implemented in hardware or a combination of hardware and software. In one configuration, the memory controller is implemented as a specialized chip that is added to a motherboard. The specialized chip may include a physical interface onto the memory bus enabling exchange of data between the specialized chip, the CPU, and the memory system.

The specialized chip may be configured to act as a hypervisor, and include circuitry that facilitates operation of the specialized chip as a hypervisor (e.g., translation circuits configured to perform translation operations for virtualization).

FIGS. 13-16 illustrate configurations and processes for unconstrained and constrained configurations used in deciding whether to load data to asymmetric memory. Because asymmetric memory may have access characteristics that increase application performance for certain types of application behaviors and decrease application performance for other types of application behaviors, a computer system may use two or more decision making profiles that are used in response to determining that a computer system and/or application is behaving in a particular manner. One type of behavior is generally described as unconstrained. Generally, a system operating in an unconstrained environment is not imposing an intense demand on memory and/or is not using existing memory resources in a manner associated with performance penalties. For instance, a computer system may be operating at less than 40% sustained memory utilization. In another instance, the computer system may have loaded a data structure, such as a specialized search index, to memory. Although the computer system may add entries sequentially to the data structure, the majority of the operations for the data structure are associated with read operations. In any event, regardless of the criteria used to identify an unconstrained configuration, if a computer system is determined to be operating in an unconstrained configuration, a computer system may use a first profile for access characteristics in deciding whether to load data to asymmetric memory. However, if the computer system is operating in a second, constrained performance range, the computer system may use a second profile of access characteristics in deciding whether to load data to asymmetric memory.

FIG. 13 is an illustration of an unconstrained configuration 1300 used by a memory controller. In particular, configuration 1300 illustrates settings that may be used to invoke a first set of access characteristics that are associated with an unconstrained configuration. As shown in configuration 1300, there are 512 GB of NOR flash memory available and 4 GB of DRAM available. A search query server application requires 278 GB, and the operating system requires 2 GB. The sustained processor utilization is 40%. The NOR flash memory is made up of 32 GB components, which have an average utilization of 16 GB.

An unconstrained profile may include determining that the asymmetric memory is being used at less than 70% utilization (278 GB out of 512 GB), is using less than 75% of DRAM, and has sustained processor utilization of less than 50%. In this instance, all three criteria have been met and the computer system is configured to use an unconstrained configuration.

Figure 14:
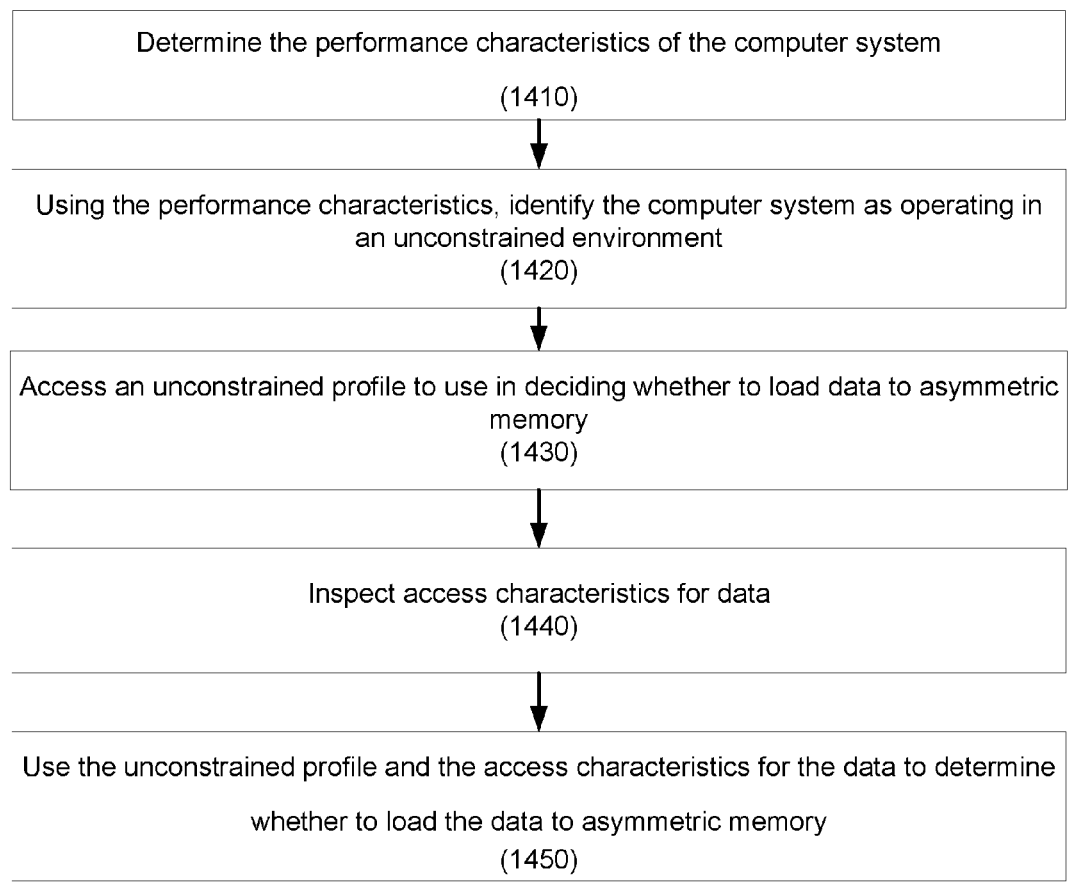
FIG. 14 is a flow chart of a process by which data is loaded to an asymmetric memory component in an unconstrained configuration.

FIG. 14 is a flow chart 1400 of a process by which data is loaded to an asymmetric memory component in an unconstrained configuration. Initially, the computer system determines the performance characteristics of the computer system (1410). In one configuration, the computer system determines how much memory an application and operating system are using, and also determines sustained and peak processor utilization. Determining the performance characteristics also may include determining how an application is using memory. For example, the computer system may determine whether memory demands are increasing, or are stable. Using the performance characteristics, the computer system then identifies the computer system as operating in an unconstrained environment (1420). Identifying the computer system as operating in an unconstrained environment may include determining that an application performance level is not impacted by limited availability of memory. The computer system may determine that an unconstrained environment exists when sustained processor utilization is less than a first threshold (e.g. 30%), asymmetric memory utilization is less than a second threshold (e.g., 50%), and symmetric memory utilization is less than a third threshold (e.g., 70%). Alternatively, the computer system may be configured to identify an unconstrained threshold when a subset of several conditions exist. For example, the computer system may determine that an unconstrained environment exists when (1) sustained processor utilization is less than a threshold (e.g. 10%), (2) asymmetric memory utilization is less than a threshold (e.g., 30%), (3) symmetric memory utilization is less than a third threshold (e.g., 40%), or (4) if sustained processor utilization is lies within a first range (e.g. 10-25%) and asymmetric memory utilization lies within a second range (e.g., 30-35%).

The computer system then accesses an unconstrained profile to use in deciding whether to load data to asymmetric memory (1430). Accessing an unconstrained profile includes accessing metrics that are used to determine whether data is loaded to symmetric memory or asymmetric memory. One unconstrained profile may instruct a memory controller to load data to asymmetric memory that has been read more than five times in an observation window with less than two writes over the course of ten observation windows. Another unconstrained profile may instruct a memory controller to load 1 GB of the most accessed data residing in symmetric memory that has not been updated (e.g., written) in the observation window. Still another unconstrained profile may instruct a memory controller to load all data that has been read more than three times in the observation window without being updated (or written to), but require that any blocks loaded to a NOR flash bank be 70% utilized. The unconstrained profile may instruct the memory controller to continue accumulating candidates the block being loaded until the 70% utilization threshold is reached.

The computer system then inspects access characteristics for data (1440). A memory controller receiving a request to read data from a particular perceived physical address may inspect access characteristics for the data in the page table and determine that the perceived physical address has been (1) read three times in the observation window and (2) not been written.

The computer system then uses the unconstrained profile and the access characteristics for the data to determine whether to load the data to asymmetric memory (1450). Thus, where the unconstrained profile requires that a perceived physical address be read more than five times in an observation widow and not been written to during the same observation window, a first perceived physical address that has been read twice is not loaded to asymmetric memory. A second perceived physical address that has been read ten times and written once also is not loaded to asymmetric memory. A third perceived physical address that has been read seven times and never been written to since data has been loaded to the perceived physical address meets the criteria required in the unconstrained profile. As a result, the computer system loads the data associated with the third perceived physical address to asymmetric memory.

FIG. 15 is an illustration of a constrained configuration 1500 used by a memory controller. As shown, configuration 1500 indicates that 600 GB of storage are being used by a search query server application where 512 GB of NOR flash is available and 2 GB of DRAM are being used by an operating system where 4 GB are available. The sustained utilization is 70% and the average utilization per 32 GB NOR flash bank is 32 GB (100%). Note that although both configurations 1300 and 1500 described NOR flash as providing the storage required by a search application and DRAM providing the storage required by the operating system, other implementations of a search application may require both DRAM and NOR flash storage. Likewise, an operating system also may be configured to use both DRAM and NOR flash storage.

In the constrained configuration shown, the search application requires more memory than the computer system is able to provide. In such a constrained environment, the computer system may encounter adverse performance issues related to the lack of available memory. As a result, the computer system may use a constrained configuration that improves system performance by better managing the way in which the asymmetric memory (e.g., NOR flash memory) is used.

In one constrained configuration where free space in asymmetric memory is not readily available, a computer system encounters a processing delay in response to receiving a request to write to a perceived physical address that maps to asymmetric memory. As a result, the constrained configuration may use thresholds that provide increased confidence that perceived physical addresses that map to asymmetric memory physical addresses will not be the subject of write operations (e.g., the data in a location will not be updated). Thus, the thresholds required for read operations may be increased to ensure that only the most requested content is loaded to asymmetric memory. Similarly, the number of tolerated write operations may be reduced to ensure that content loaded to asymmetric memory will not be updated.

In another constrained configuration where symmetric memory (e.g., DRAM) is limited and asymmetric memory is freely available, a computer system may attempt to address performance issues caused by limited symmetric memory by attempting to migrate greater amounts of data from symmetric memory to asymmetric memory. Perceived physical address that are likely to be the subject of some degree of write operations may still be migrated to asymmetric memory in order permit the symmetric memory to be used for more write intensive objects (perceived physical address). Thus, the thresholds required for read operations may be reduced so that more data is eligible to be loaded to asymmetric memory. Similarly, the thresholds required for write operations may be increased so that less write intensive data is migrated to asymmetric memory to allow for more write intensive data in symmetric memory. In one example, the performance penalty resulting from executing a limited number of write operations to asymmetric memory is less than the performance increase resulting from better utilizing symmetric memory with more write operations. Migrating less write intensive data to asymmetric memory therefore frees symmetric memory to be better used with more write intensive data.

Figure 16:
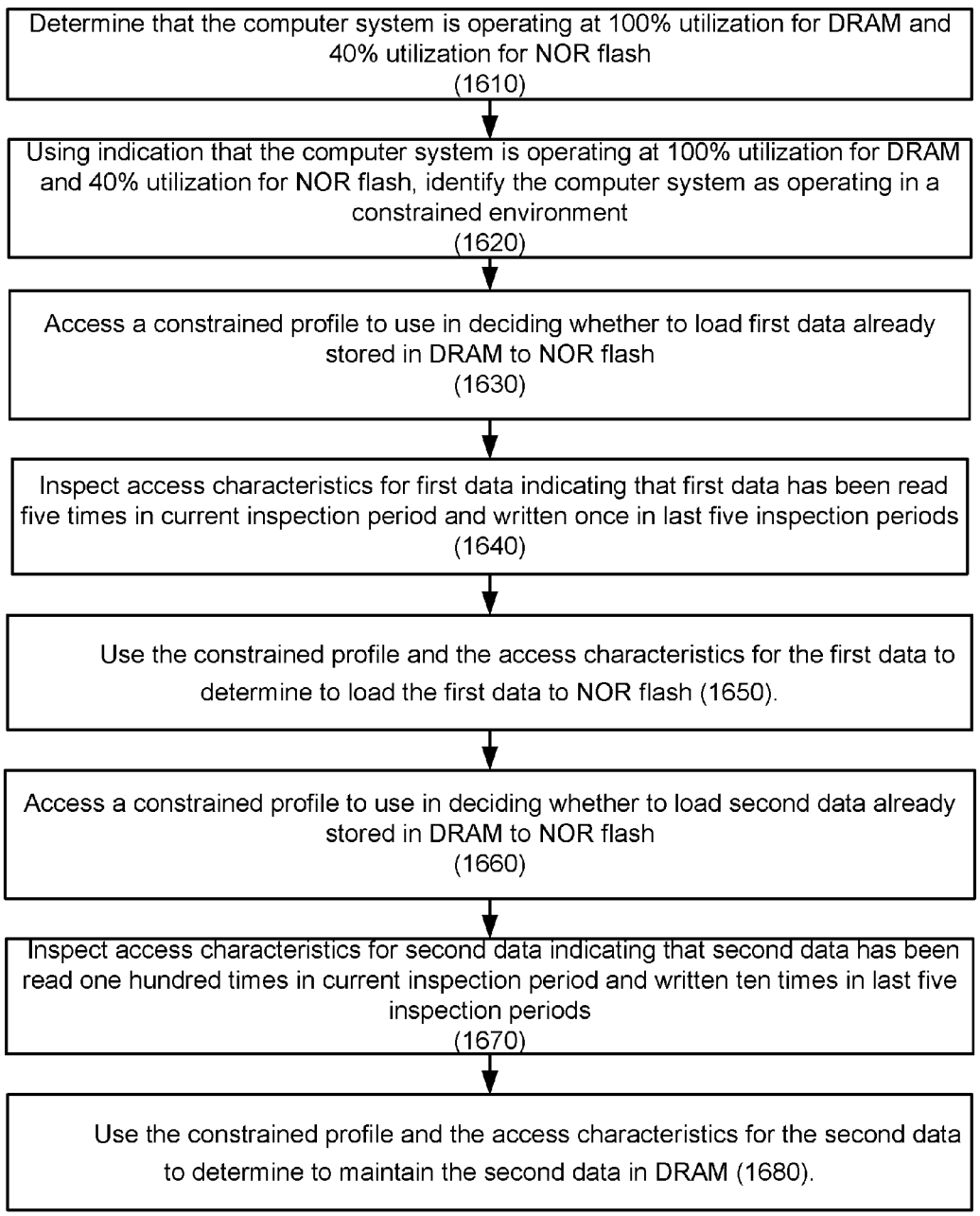
FIG. 16 is a flow chart of a process by which data is loaded to an asymmetric memory component in a constrained configuration.

FIG. 16 is a flow chart 1600 of a process by which data is loaded to an asymmetric memory component in a constrained configuration. More precisely, flow chart 1600 illustrates how a first record (e.g., first data) is loaded to NOR flash from DRAM and a second record (e.g., second data) is maintained in DRAM. Initially, the computer system is determined to be operating at 100% utilization and 40% utilization for NOR flash (1610). The computer system uses the indication that the computer system is operating at 100% utilization for DRAM and 40% utilization for NOR flash and identifies the computer system as operating in a constrained environment (1620). The computer system then accesses a constrained profile to use in deciding whether to load first data already stored in DRAM to NOR flash (1630). For example, the constrained profile may specify that any data read more than three times in the last inspection period and written less than three times in the last five inspection periods should be loaded to asymmetric memory. The computer system inspects access characteristics for first data indicating that the first data has been read five times in the current inspection period and written once in the last five inspection periods (1640). The computer system then uses the constrained profile and the access characteristics for the first data to determine to load the first data to NOR flash (1650).

The computer system accesses a constrained profile to use in deciding whether to load second data already stored in DRAM to NOR flash (1660). The computer system inspects access characteristics for the second data indicating that second data has been read one hundred times in the current inspection period and written ten times in the last five inspection periods (1670). The computer system inspects access characteristics for the second data indicating that the second data has been read one hundred times in the current inspection period and written ten times in the last five inspection periods (1670). Using the constrained profile that specifies that any data read more than three times in the last inspection period and written less than three times in the last five inspection periods should be loaded to asymmetric memory, the computer system determines that the second data should be maintained in DRAM (1680).

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Other implementations are within the scope of the claims. For example, although certain operations were described as loading an object to symmetric memory and then asymmetric memory, an object may be automatically loaded to asymmetric memory in the first instance. Alternatively or in addition, access to the directly-loaded object in asymmetric memory then may be tracked in order to determine whether the object should be maintained in asymmetric memory.

In one configuration, an agent that updates the MMU page tables is implemented in software. Alternatively, the agent may include a hypervisor that is implemented as part of the CPU hardware with associated firmware. This hypervisor within the CPU may interface with specialized circuitry that provides access information, and links the access information to a memory table. The circuitry also may track how particular addresses are being used in order to determine which objects should be migrated to asymmetric memory.

In another example, other useful implementations could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of managing a main memory that includes symmetric memory components associated with a first collection of memory operations and asymmetric memory components associated with a second collection of memory operations, where the symmetric memory components are each configured to enable random access write operations in which an address within a block of the symmetric memory component is written without affecting the availability of other addresses within the block of the symmetric memory component, and where the asymmetric memory components are each configured to enable block write operations in which an address within a block of one of the asymmetric memory components affects the availability of other addresses within the block of the asymmetric memory component, the method comprising:

receiving, on a central processing unit (CPU), a command from an application to read data associated with a virtual address that is mapped to the main memory;

in response to determining that the virtual address is mapped to one of the symmetric memory components of the main memory, tracking memory use characteristics indicating how the data associated with the virtual address is being accessed;

determining, based on the memory use characteristics of the data associated with the virtual address, that the data associated with the virtual address is suitable for access on an asymmetric memory component of the main memory;

migrating the data associated with the virtual address to the asymmetric memory component of the main memory such that the virtual address is updated to reflect the migration;

receiving, after the loading and using the memory management unit, a command from the application to read the data associated with the virtual address; and retrieving, responsive to the received command, the data associated with the virtual address from the asymmetric memory component of the main memory.

2. The method of claim 1 wherein the symmetric memory component includes dynamic random access memory (DRAM) and the asymmetric memory component includes NOR flash, where the DRAM is configured to enable random access write operations in which an address within a block of the DRAM is written without affecting the availability of other addresses within the block of the DRAM, and where the NOR flash is configured to enable block write operations in which an address within a block of one of the NOR flash affects the availability of other addresses within the block of the NOR flash, and further comprising:

in response to determining that the virtual address is mapped to one of the DRAM blocks, tracking memory use characteristics indicating how the data associated with the virtual address is being accessed;

determining, based on the memory use characteristics of the data associated with the virtual address, that the data associated with the virtual address is suitable for access on NOR flash of the main memory;

migrating the data associated with the virtual address to the NOR flash of the main memory such that the virtual address is updated to reflect the migration;

receiving, after the loading and using the memory management unit, a command from the application to read the data associated with the virtual address; and retrieving, responsive to the received command, the data associated with the virtual address from the NOR flash of the main memory.

3. The method of claim 1 wherein determining that the data associated with the virtual address is suitable for access on the asymmetric memory component of the main memory includes determining that the access characteristics are related to a profile that indicates whether the data should be loaded to the asymmetric memory component based on a number of times the data has been read and the number of times that the data has been updated using a write instruction.

4. The method of claim 1 wherein:
the asymmetric memory component has asymmetric access characteristics including:
  (1) the asymmetric memory component performs read operations at a first rate and performs write operations at a second rate that is more than an order of magnitude different than the first rate,
  (2) the asymmetric memory component uses an asymmetric memory access protocol, and
  (3) the asymmetric memory component includes non-volatile storage capability; and the symmetric memory component has symmetric access characteristics including:
  (1) the symmetric memory component performs read operations at a rate that that differs by less than an order of magnitude from a rate at which write operations are performed,
  (2) the symmetric memory component uses a symmetric memory access protocol, and
  (3) the symmetric memory component includes a volatile storage capability.

5. The method of claim 1 wherein loading the data associated with the virtual address to the asymmetric memory component of main memory includes loading the data as part of a block write that includes additional content that is different than the data.

6. The method of claim 1 further comprising:
identifying, from a first read instruction, the data to be loaded to the asymmetric memory component as a first portion;
storing the first portion in the symmetric memory component of the main memory;
identifying, from a second read instruction, other content to be loaded to the symmetric memory component as a second portion;
storing the second portion in the symmetric memory component of the main memory;
structuring the first portion and the second portion as a block to be written to the asymmetric memory component; and
writing the block that includes the first portion and the second portion to the asymmetric memory component.

7. The method of claim 1 wherein determining that the data associated with the virtual address is suitable for access on the asymmetric memory component includes:
determining that an application is operating in a constrained environment for memory resources; and
adjusting constrained metrics used in determining whether to load the data to the asymmetric memory component to increase a likelihood that the data is loaded the asymmetric memory component.

8. The method of claim 1 wherein determining that the data associated with the virtual address is suitable for access on the asymmetric memory component includes:
determining that an application is unconstrained for memory resources; and
using unconstrained metrics to determine whether to load the data to the asymmetric memory component.

9. The method of claim 1 further comprising setting a write protection bit for the data that has been loaded to asymmetric memory that regulates subsequent write access to the virtual address for the data.

10. The method of claim 1 wherein determining, based on the memory use characteristics, that the data associated with the virtual address is suitable for access on the asymmetric memory component of the main memory includes determining that a first threshold number of reads of the data has occurred in an observation window.

11. The method of claim 1 further comprising determining that the data associated with the virtual address is not suitable for access on the asymmetric memory component of the main memory in response to determining that a second threshold number of updates to the data has been requested in an observation window.

12. A system that manages a main memory that includes symmetric memory components associated with a first collection of memory operations and asymmetric memory components associated with a second collection of memory operations, where the symmetric memory components are each configured to enable random access write operations in which an address within a block of the symmetric memory component is written without affecting the availability of other addresses within the block of the symmetric memory component, and where the asymmetric memory components are each configured to enable block write operations in which an address within a block of one of the asymmetric memory components affects the availability of other addresses within the block of the asymmetric memory component, the system instructions that when executed on a processor perform operations that include:
receiving, on a central processing unit (CPU), a command from an application to read data associated with a virtual address that is mapped to the main memory;
in response to determining that the virtual address is mapped to one of the symmetric memory components of the main memory, tracking memory use characteristics indicating how the data associated with the virtual address is being accessed;
determining, based on the memory use characteristics of the data associated with the virtual address, that the data associated with the virtual address is suitable for access on an asymmetric memory component of the main memory;
migrating the data associated with the virtual address to the asymmetric memory component of the main memory such that the virtual address is updated to reflect the migration;
receiving, after the loading and using the memory management unit, a command from the application to read the data associated with the virtual address; and
retrieving, responsive to the received command, the data associated with the virtual address from the asymmetric memory component of the main memory.

13. The system of claim 12 wherein the symmetric memory component includes dynamic random access memory (DRAM) and the asymmetric memory component includes NOR flash, where the DRAM is configured to enable random access write operations in which an address within a block of the DRAM is written without affecting the availability of other addresses within the block of the DRAM, and where the NOR flash is configured to enable block write operations in which an address within a block of one of the NOR flash affects the availability of other addresses within the block of the NOR flash, and further comprising:
in response to determining that the virtual address is mapped to one of the DRAM blocks, tracking memory use characteristics indicating how the data associated with the virtual address is being accessed;
determining, based on the memory use characteristics of the data associated with the virtual address, that the data associated with the virtual address is suitable for access on NOR flash of the main memory;
migrating the data associated with the virtual address to the NOR flash of the main memory such that the virtual address is updated to reflect the migration;
receiving, after the loading and using the memory management unit, a command from the application to read the data associated with the virtual address; and
retrieving, responsive to the received command, the data associated with the virtual address from the NOR flash of the main memory.

14. The system of claim 12 wherein determining that the data associated with the virtual address is suitable for access on the asymmetric memory component of the main memory includes determining that the access characteristics are related to a profile that indicates whether the data should be loaded to the asymmetric memory component based on a number of times the data has been read and the number of times that the data has been updated using a write instruction.

15. The system of claim 12 wherein:
the asymmetric memory component has asymmetric access characteristics including:
(1) the asymmetric memory component performs read operations at a first rate and performs write operations at a second rate that is more than an order of magnitude different than the first rate, (2) the asymmetric memory component uses an asymmetric memory access protocol, and
(3) the asymmetric memory component includes non-volatile storage capability; and
the symmetric memory component has symmetric access characteristics including:
(1) the symmetric memory component performs read operations at a rate that that differs by less than an order of magnitude from a rate at which write operations are performed,
(2) the symmetric memory component uses a symmetric memory access protocol, and
(3) the symmetric memory component includes a volatile storage capability.

16. The system of claim 12 wherein loading the data associated with the
virtual address to the asymmetric memory component of main memory includes loading the data as part of a block write that includes additional content that is different than the data.

17. The system of claim 12 further comprising:
identifying, from a first read instruction, the data to be loaded to the asymmetric memory component as a first portion;
storing the first portion in the symmetric memory component of the main memory;
identifying, from a second read instruction, other content to be loaded to the symmetric memory component as a second portion;
storing the second portion in the symmetric memory component of the main memory;
structuring the first portion and the second portion as a block to be written to the asymmetric memory component; and
writing the block that includes the first portion and the second portion to the asymmetric memory component.

18. The system of claim 12 wherein determining that the data associated with the virtual address is suitable for access on the asymmetric memory component includes:
- determining that an application is operating in a constrained environment for memory resources; and
- adjusting constrained metrics used in determining whether to load the data to the asymmetric memory component to increase a likelihood that the data is loaded the asymmetric memory component.

19. The system of claim 12 wherein determining that the data associated with the virtual address is suitable for access on the asymmetric memory component includes:
- determining that an application is unconstrained for memory resources; and
- using unconstrained metrics to determine whether to load the data to the asymmetric memory component.

20. A system that manages a main memory that includes symmetric memory components associated with a first collection of memory operations and asymmetric memory components associated with a second collection of memory operations, where the symmetric memory components are each configured to enable random access write operations in which an address within a block of the symmetric memory component is written without affecting the availability of other addresses within the block of the symmetric memory component, and where the asymmetric memory components are each configured to enable block write operations in which an address within a block of one of the asymmetric memory components affects the availability of other addresses within the block of the asymmetric memory component, the system instructions that when executed on a processor perform operations that include:
- means for tracking memory use characteristics indicating how the data associated with the virtual address is being accessed, in response to determining that the virtual address is mapped to one of the DRAM blocks,;
- means for determining, based on the memory use characteristics of the data associated with the virtual address, that the data associated with the virtual address is suitable for access on NOR flash of the main memory;
- means for migrating the data associated with the virtual address to the NOR flash of the main memory such that the virtual address is updated to reflect the migration;
- means for receiving, after the loading and using the memory management unit, a command from the application to read the data associated with the virtual address; and
- means for retrieving, responsive to the received command, the data associated with the virtual address from the NOR flash of the main memory.

* * * * *